United States Patent
Campos et al.

(10) Patent No.: US 11,916,747 B1
(45) Date of Patent: Feb. 27, 2024

(54) SYSTEMS AND METHODS FOR AUTOMATIC DISCOVERY OF A COMMUNICATION NETWORK

(71) Applicant: Cable Television Laboratories, Inc., Louisville, CO (US)

(72) Inventors: Luis Alberto Campos, Superior, CO (US); Christopher J. Corcimiglia, Cumming, GA (US); Thomas Holtzman Williams, Longmont, CO (US); Lin Cheng, Superior, CO (US); Sayandev Mukherjee, Santa Clara, CA (US); Belal Hamzeh, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/822,725

(22) Filed: Aug. 26, 2022

Related U.S. Application Data

(60) Provisional application No. 63/237,288, filed on Aug. 26, 2021.

(51) Int. Cl.
*H04L 41/12* (2022.01)
(52) U.S. Cl.
CPC .................. *H04L 41/12* (2013.01)
(58) Field of Classification Search
CPC ...................................... H04L 41/12
See application file for complete search history.

(56) References Cited

U.S. PATENT DOCUMENTS

| | | | |
|---|---|---|---|
| 5,235,339 A * | 8/1993 | Morrison | G01S 13/52 342/194 |
| 8,908,538 B1 | 12/2014 | Williams | |
| 2005/0143096 A1* | 6/2005 | Boesch | G01S 19/14 455/456.3 |
| 2006/0050648 A1* | 3/2006 | Eydelman | H04L 45/00 370/255 |
| 2007/0150444 A1* | 6/2007 | Chesnais | H04L 67/535 |
| 2008/0080414 A1* | 4/2008 | Thubert | H04W 76/12 370/328 |

(Continued)

OTHER PUBLICATIONS

X. Dong, D. Thanou, M. Rabbat and P. Frossard, "Learning Graphs From Data: A Signal Representation Perspective," IEEE Signal Processing Magazine, vol. 36, No. 3, pp. 44-63, May 2019.

(Continued)

*Primary Examiner* — Mohammad S Adhami
*Assistant Examiner* — Raul Rivas
(74) *Attorney, Agent, or Firm* — PdZ Patent Law, PLLC

(57) ABSTRACT

A method for automatic discovery of a communication network including a hub, a plurality of termination devices, and a plurality of network elements. The method includes (a) associating respective geographic information with each termination device, (b) determining a respective distance of each termination device from the hub, (c) grouping, at least partially based on diagnostic information from the communication network, two or more of the plurality of termination devices sharing a common characteristic, (d) determining a topology of the communication network, and (e) determining a respective characteristic of at least one network element of the plurality of network elements.

17 Claims, 20 Drawing Sheets

(56) References Cited

U.S. PATENT DOCUMENTS

| | | | | |
|---|---|---|---|---|
| 2011/0194597 A1* | 8/2011 | Wolcott | .............. | H04L 43/0823 |
| | | | | 375/229 |
| 2012/0220313 A1* | 8/2012 | Li | ......................... | H04W 64/00 |
| | | | | 455/456.1 |
| 2016/0085614 A1* | 3/2016 | Aldereguia | ........... | H04L 1/1607 |
| | | | | 714/801 |
| 2018/0034774 A1* | 2/2018 | Jarraya | ............... | H04L 63/0236 |
| 2018/0288563 A1* | 10/2018 | Krzych | ................ | H04W 4/021 |
| 2018/0351809 A1* | 12/2018 | Meredith | ............ | H04L 41/5022 |
| 2019/0166057 A1* | 5/2019 | Gilson | ................ | H04L 47/2416 |
| 2020/0112903 A1* | 4/2020 | Wolcott | ............... | H04W 36/24 |
| 2021/0367651 A1* | 11/2021 | Zhang | ................ | H04B 7/0628 |

OTHER PUBLICATIONS

R. Tibshirani, "Regression shrinkage and selection via the Lasso," Journal of the Royal Statistical Society, Series B, vol. 58, No. 1, pp. 267-288, 1995.

N. Meinshausen and P. Buhlmann, "High-dimensional graphs and variable selection with the asso," Annals of Statistics, vol. 34, No. 3, pp. 1436-1462, 2006.

F. Pedregosa et al., "Scikit-learn: Machine Learning in Python," Journal of Machine Learning Research, vol. 12, pp. 2825-2830, 2011. https://scikit-learn.org/stable/modules/generated/sklearn.linear_model.Lasso.html.

E. Pavez, H.E. Egilmez and A. Ortega, "Learning GraphsWith Monotone Topology Properties and Multiple Connected Components," IEEE Transactions on Signal Processing, vol. 66, No. 9, pp. 2399-2413, May 2018.

* cited by examiner

US 11,916,747 B1

SYSTEMS AND METHODS FOR AUTOMATIC DISCOVERY OF A COMMUNICATION NETWORK

CROSS REFERENCE TO RELATED APPLICATIONS

This application claims the benefit of priority to U.S. Provisional Patent Application No. 63/237,288, filed on Aug. 26, 2021, which is incorporated herein by reference.

BACKGROUND

Communication networks are widely used to transport data between two or more locations. For example, access communication networks, including but not limited to cable communication networks, optical communication networks, digital subscriber line (DSL) communication networks, cellular wireless communication networks, satellite wireless communication networks, and fixed wireless communication networks, are used to provide communication services to subscribers in respective service areas. As another example, transmission communication networks are used to transmit data between two or more points. Communication networks often include significant infrastructure distributed over a large geographic area.

DETAILED DESCRIPTION OF THE EMBODIMENTS

Figure 1:
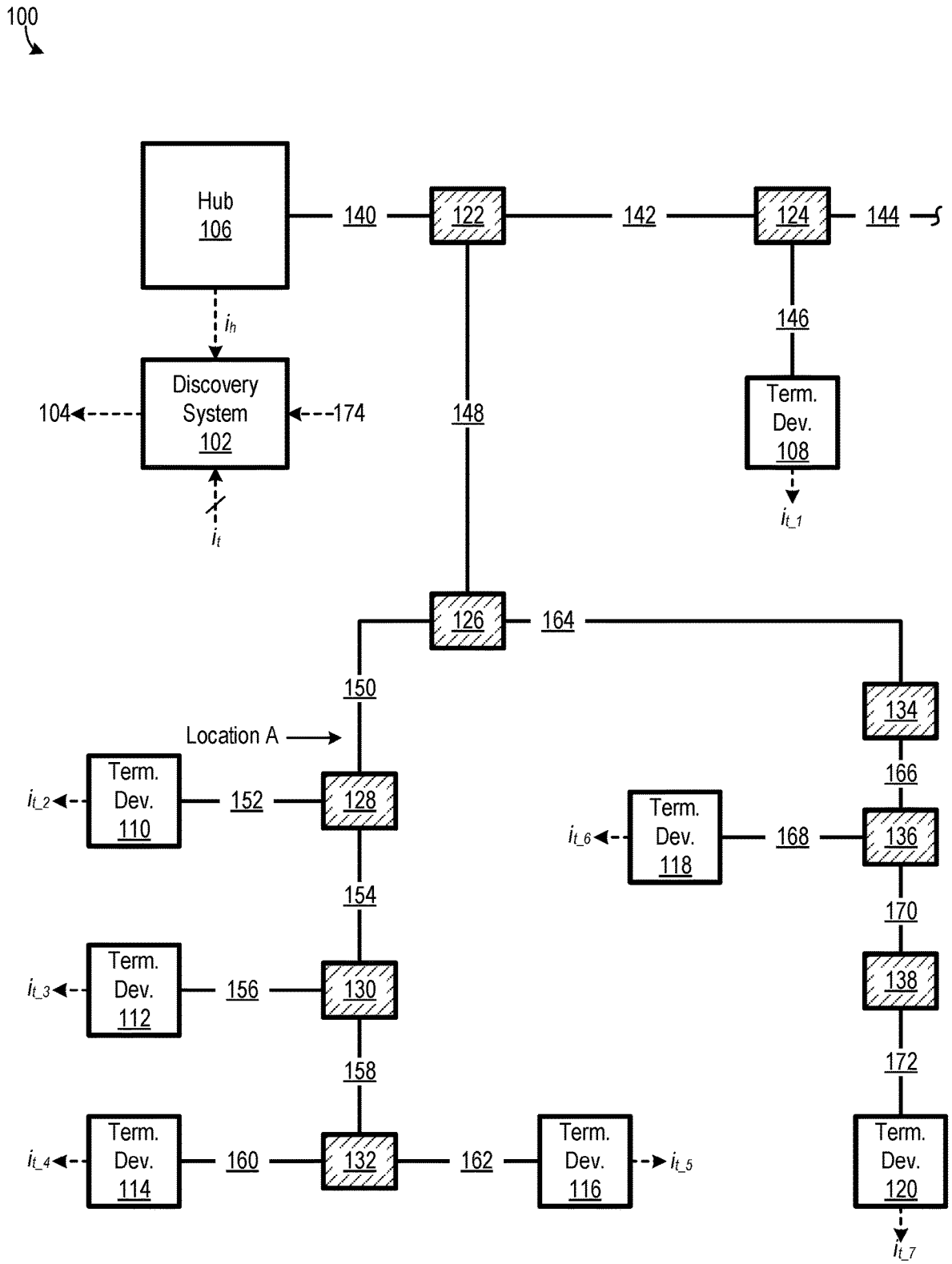
FIG. 1 is a schematic diagram of a communication network including a system for automatic discovery of the communication network, according to an embodiment.

There are many benefits to having accurate and detailed records of a communication network. For example, accurate and detailed communication network records may enable efficient repair or upgrade of the communication network. For instance, assume that a communication network subscriber is experiencing a service impairment. Detailed knowledge of the communication network's topology may enable the communication network's operator to quickly identify portions of the network that could be causing the impairment, thereby promoting efficient identification and repair of the source of service impairment. As another example, assume that a communication network operator wishes to deploy service to a new wireless access point, such as a cellular "small cell," e.g., a small cell operating according to a $3^{rd}$ Generation Partnership (3GPP) standard. The communication network operator needs to know location and configuration of network infrastructure in the vicinity of the wireless access point to design a service link for the wireless access point. Accurate and detailed records of the communication network's topology in the vicinity of the wireless access point may significantly expedite the service link design process relative to a scenario where the communication network operator must investigate network topology before beginning the design process.

Additionally, accurate and detailed communication network records are a prerequisite to use of many advanced communication network management tools. For example, network analysis tools generally can provide accurate analysis only if they are provided accurate input data on a subject communication network. Moreover, communication network records generally must be in logical form, e.g., stored in a manner such that constituent data can be recognized and accessed by a computer or other machine, for the records to be used with modem communication network management tools and data access methods.

However, quantity and accuracy of communication network records, such as records describing a communication network's topology and constituent elements, may vary widely. For example, some communication network operators have spent considerable effort in recording many details of their communication network's topology and constituent elements, while other communication network operators have employed record keeping practices resulting in missing and/or erroneous information. Even in the best of cases, a diligent communication network operator may have records that are incorrect or outdated, such as due to data entry errors or due to changes in the communication network that have occurred since the communication network was installed. Furthermore, some communication network records may exist solely in paper form, which makes the records effectively inaccessible when using modem data access means. Moreover, a communication network operator may lack access to records of a communication network acquired from another party.

Disclosed herein are systems and methods for automatic discovery of a communication network which may at least partially overcome the above discussed problems by automatically generating records of a communication network. For example, certain embodiments leverage a plurality of available data sources to automatically determine one or more characteristics of the operator's communication network, such as topology of the communication network, type and/or location of constituent elements of the communication network, power characteristics of the communication network, etc. Additionally, particular embodiments are capable of functioning even with communication networks where some constituent elements are incapable of providing diagnostic information. Furthermore, certain embodiments are capable of automatic discovery of a healthy communication network, as well discovery of a communication network that is experiencing a problem. Moreover, some embodiments are capable of determining one or more communication network characteristics using a plurality of different procedures, which helps achieve high confidence that the determined communication network characteristics are valid. Additionally, certain embodiments employ machine learning, such as artificial intelligence, when determining communication network characteristics, such as to supplement analytical analysis of network characteristics.

The new systems and methods disclosed herein have numerous applications. For example, the new systems and methods may be used to provide automated guidance, such as to automatically guide analysis, repair, maintenance, and/or expansion of a communication network, or for automated workforce training, such as to identify erroneous modifications to a communication network. As another example, the new systems and methods may facilitate performance optimization of a communication network. For instance, the new systems and methods may identify ideal operating profiles of communication network elements (e.g., ideal modulation order or ideal power levels), provide underlying data for simulating various configurations of the communication network, identify ideal locations of network elements (e.g., ideal topological locations of amplifiers), identify ideal communication network power configuration, and/or identify unneeded network elements, such as a superfluous drop amplifier. As an additional example, the new systems and methods may be used for fraud detection, such as to identify unauthorized access to a communication network or to identify unauthorized relocation of a termination device. Furthermore, the new systems and methods may support a transition from an "as-built" communication network to an "as-is" communication network by providing records reflecting the communication network in its current state. Moreover, the new systems and methods may support communication network expansion and/or upgrades, such as by providing network records to support extending optical cable deeper into a communication network service area, expanding communication network bandwidth, and deploying new network elements, such as new cellular small cells and new Wi-Fi hotspots. Additionally, the new systems and methods may enable on-demand network characterization, such as on-demand determination of communication network topology and/or on-demand determination of communication network constituent components. Furthermore, the new systems and methods may be used to accurately characterize a network to facilitate service level agreement (SLA) estimation.

FIG. 1 is a schematic diagram of a communication network 100 including a system 102 for automatic discovery of communication network 100, where system 102 is one embodiment of the new systems disclosed herein. System 102 for automatic discovery of communication network 100 is henceforth referred to as "discovery system 102" for brevity. As discussed further below, discovery system 102 is advantageously configured to automatically generate records 104 of communication network 100. In this document, "records" of a communication network may encompasses any information on the communication network, including but not limited to, one or more of topology of the communication network, identity of elements of the communication network, description of elements of the communication network (e.g., manufacturer, model, class, specifications, type, and/or serial number of the elements), location of elements of the communication network, lengths of cables or other data-carrying elements of the communication network, status of the communication network, performance of the communication network, description of impairments of the communication network, location of impairments of the communication network, power consumption of one or more elements of the communication network, available power in the communication network, capacity of the communication network, available capacity of the communication network, spare capacity of the communication network, theft of service from the communication network, unauthorized connection to the communication network, and quantity and/or type of termination devices connected to the communication network.

Communication network 100 further includes a hub 106, termination devices 108-120, network elements 122-138, and communication links 140-172. In some embodiments, hub 106 includes one or more of (a) a modem termination system, such as a cable modem termination system (CMTS) or a digital subscriber line access multiplexer (DSLAM), (b) an optical line terminal (OLT), (c) a core network, such as a wireless core network, e.g., configured to operate at least partially according to a Third Generation Partnership (3GPP) standard, or a satellite wireless core network, (d) a network switch, (e) a network router, and (f) a central network element. Each termination device 108-120 is configured to communicatively interface one or more network clients (not shown) to communication network 100. In some embodiments, each termination device 108-120 includes one or more of (a) a modem, such as a cable modem (CM), a digital subscriber line (DSL) modem, or a wireless modem (e.g., configured to operate with a cellular wireless communication link, a Wi-Fi wireless communication link, a satellite wireless communication link, a Bluetooth wireless communication link, a long range (LoRa) wireless communication link, or a Zigbee wireless communication link), (b) an optical network terminal (ONT), and (c) an optical network unit (ONU). Each termination device 108-120 need not have the same configuration. For example, termination device 108 could be an ONT while termination device 110 is a CM.

Network elements 122-138 and communication links 140-172 collectively communicatively couple termination devices 108-120 to hub 106. Network elements 122-138 may be active network elements, passive network elements, or a mixture of active and passive network elements. In some embodiments, each network element 122-138 include on or more of (a) a splitter, e.g., an electrical splitter or an optical splitter, (b) a tap, e.g., an electrical tap or an optical tap, (c) an amplifier, e.g., an electrical amplifier or an optical amplifier, (d) a power inserter, (e) an optical circulator, (f) a switch, e.g., an electrical switch or an optical switch, (e) a router, (f) a translator, (g) a fiber node, (h) a remote terminal, (i) a pedestal, (j) a cross box, (k) a splice, (l) a coupler, (m) a repeater, and (n) a wireless access point, e.g., configured to operate according to one or more of a cellular wireless communication protocol (e.g., a 3GPP-based cellular wireless communication protocol), a Wi-Fi wireless communication protocol (e.g., an Institute of Electrical Electronics Engineers (IEEE)-based wireless communication protocol), a satellite wireless communication protocol (e.g., using very low earth orbit (VLEO) satellites, low earth orbit (LEO) satellites, medium earth orbit (MEO) satellites, and/or geostationary equatorial orbit (GEO) satellites), a Bluetooth wireless communication protocol, a LoRa wireless communication protocol, a Zigbee wireless communication protocol, or extensions or successors of any of the foregoing communication protocols. Each network element 122-138 need not have the same configuration. For example, network element 122 could be a splitter and network element 126 could be a fiber node.

Each communication link 140-172 communicatively couples two or more elements of communication network 100. For example, communication link 140 communicatively couples hub 106 and network element 122, and communication link 142 communicatively couples network elements 122 and 124. In some embodiments, each communication link 140-172 includes one or more of (a) a wireline communication link, such as a wireline communication link embodied by an electrical cable (e.g., a coaxial electrical cable or a twisted pair electrical cable) or an optical cable (b) and wireless communication link, such as a wireless communication link using radio frequency (RF) wireless communication signals or optical wireless communication signals. Each communication link 140-172 need not have the same configuration. For example, communication link 140 could be an optical cable wireline communication link, communication link 150 could be a coaxial electrical cable wireline communication link, and communication link 162 could be a wireless communication link. Communication link 144 extends to a portion of communication network 100 that is not shown in FIG. 1.

Examples of communication protocols supported by communication network 100 include, but are not limited to, one or more of a 3GPP wireless communication protocol (e.g., a long term evolution (LTE) communication protocol, a fifth generation (5G) wireless communication protocol, and/or a sixth generation (6G) wireless communication protocol), a Wi-Fi wireless communication protocol, a satellite wireless communication protocol, a cable communication protocol (e.g., a Data Over Cable Service Interface Specification (DOCSIS) communication protocol), an electrical Ethernet protocol, an Ethernet passive optical network (EPON) communication protocol, a radio frequency of over glass (RFOG) communication protocol, a Gigabit-capable passive optical network (GPON) communication protocol, a coherent passive optical network (CPON) communication protocol (point-to-point, point-to-multipoint, cascaded, etc.), a Multi-Media over Coax (MoCA) communication protocol, a HomePNA (G.hn) communication protocol, a Bluetooth communication protocol, a LoRa communication protocol, a Zigbee communication protocol, and any variations, improvements, and/or evolutions thereof. Communication network 100 is optionally configured to a support a plurality of communication protocols.

The quantity and type of elements of communication network 100, as well as the topology of communication network 100, are implementation dependent and therefore may vary. For example, communication network 100 could include a smaller or larger number of termination devices. As another example, the quantity and configuration of network elements and communication links communicatively coupling termination devices 108-120 to hub 106 may vary. As an additional example, while communication network 100 is depicted as having a tree and branch topology, communication network 100 could be modified to have another topology, such as a mesh topology or a ring topology.

As discussed above, communication network 100 may include multiple types of network elements 122-138 as well as multiple type of communication links 140-172. Accordingly, certain embodiments of communication network 100 are hybrid communication networks or are converged communication networks. For example, some embodiments of communication network are hybrid optical-electrical communication networks, such as a hybrid optical cable and coaxial electrical cable communication network or a hybrid optical cable and twisted pair electrical cable communication network. As another example some embodiments of communication network 100 are converged wireline (e.g., cable, DSL, optical, or Ethernet wireline) and wireless (e.g., cellular, Wi-Fi, and/or satellite wireless) communication networks.

Figure 2:
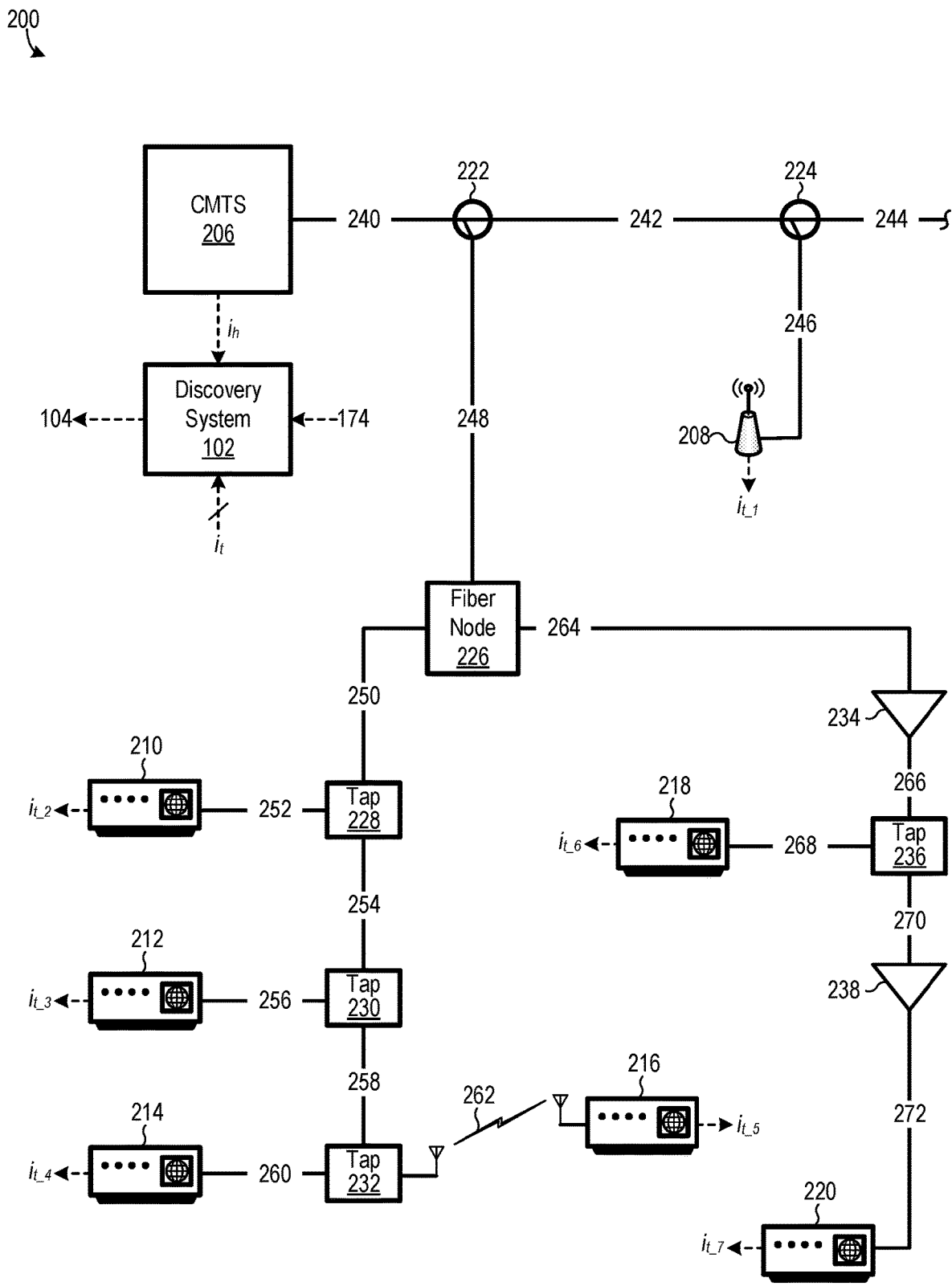
FIG. 2 is a schematic diagram of an embodiment of the FIG. 1 communication network that is substantially based on cable network elements.
Figure 3:
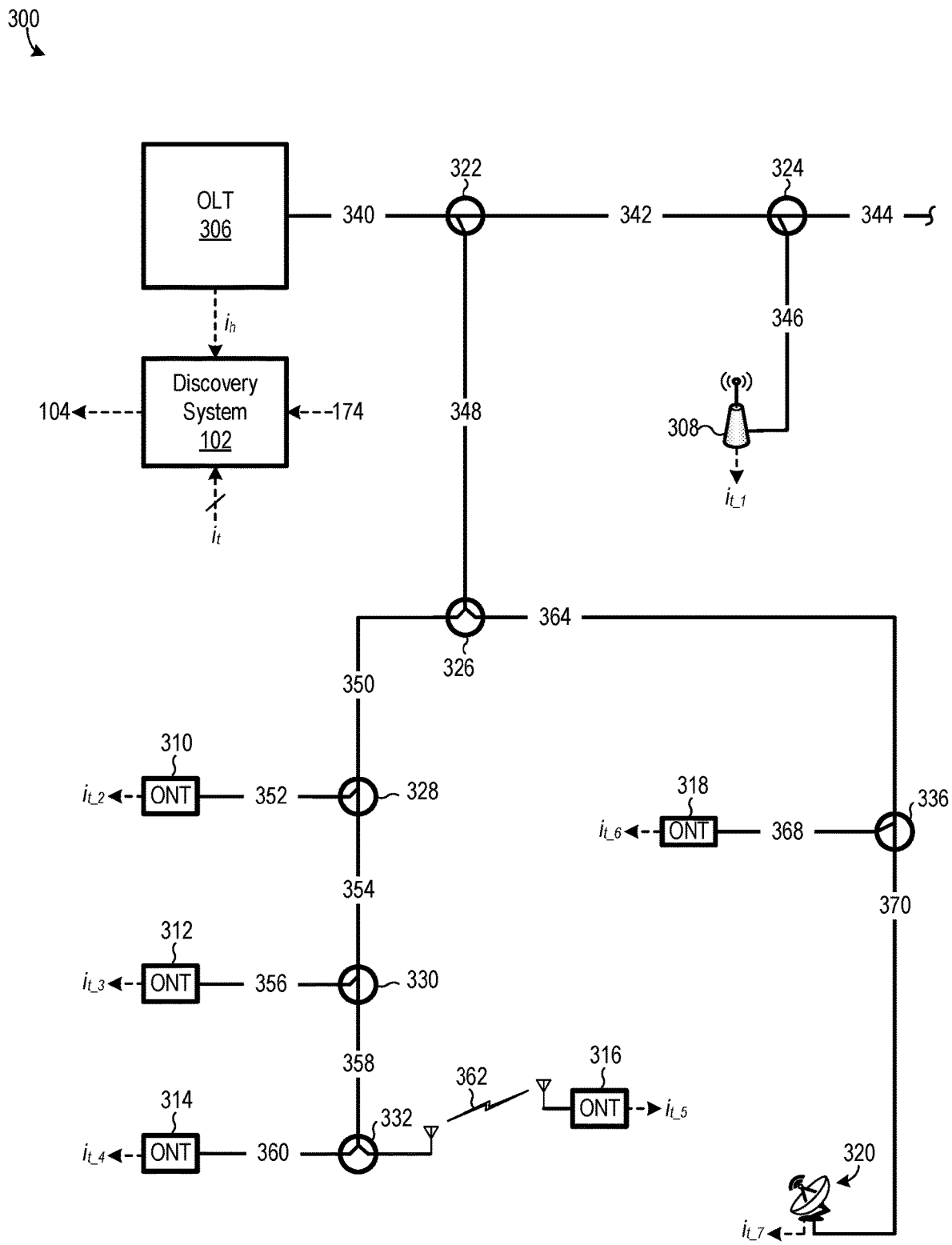
FIG. 3 is a schematic diagram of an embodiment of the FIG. 1 communication network that is substantially based on passive optical network elements.
Figure 4:
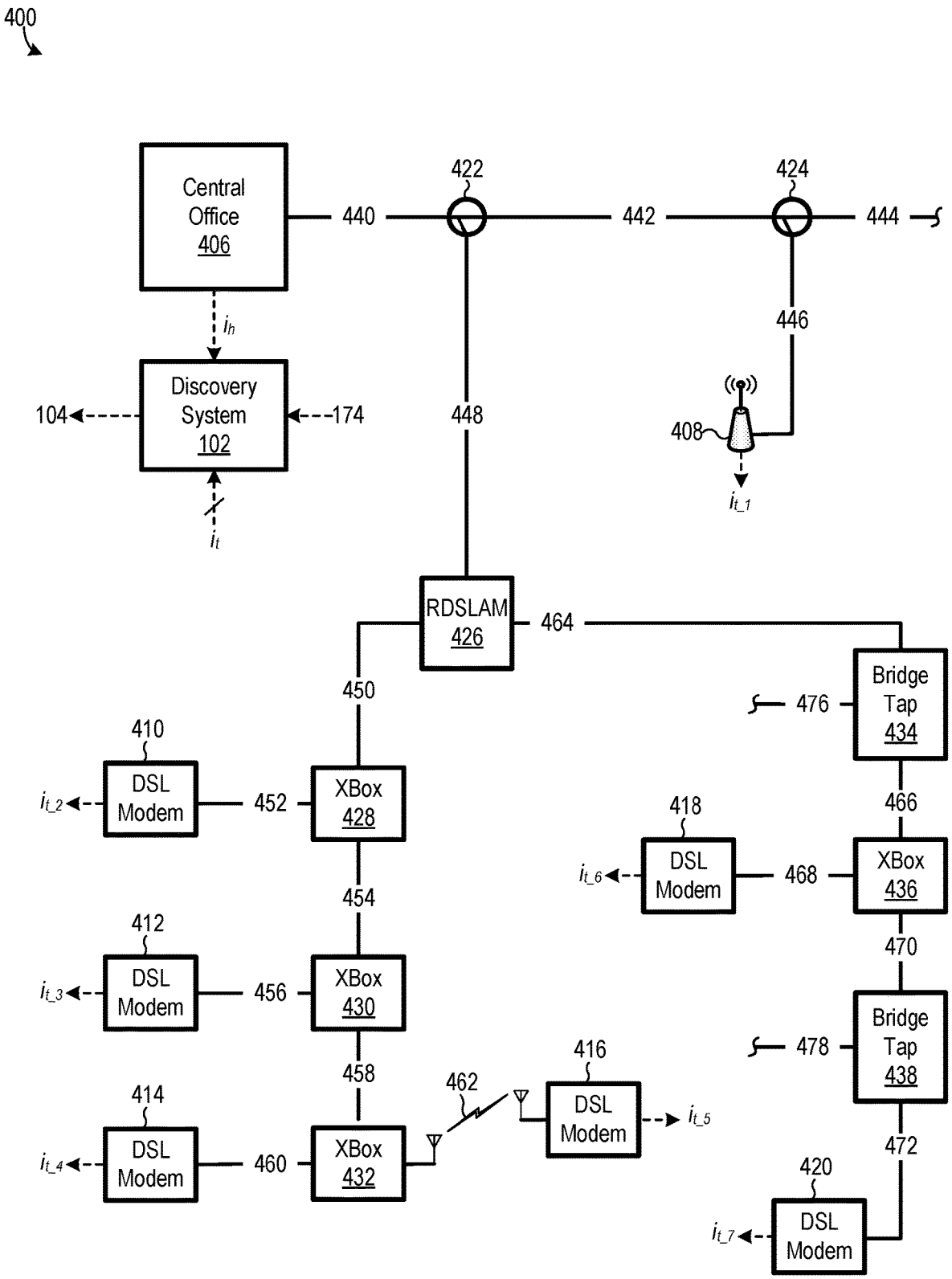
FIG. 4 is a schematic diagram of an embodiment of the FIG. 1 communication network that is substantially based on digital subscriber line (DSL) network elements.

Discussed below with respect to FIGS. 2-4 are a few example embodiments of communication network 100. It is understood, though, that communication network 100 is not limited to these example embodiments.

FIG. 2 is a schematic diagram of a communication network 200, which is an embodiment of communication network 100 of FIG. 1 that is substantially based on cable network elements. Some embodiments of communication network 200 are configured to operate at least partially according to a DOCSIS communication protocol. Hub 106 of communication network 100 is embodied by a CMTS 206 in communication network 200, and termination devices 110-120 of communication network 100 are embodied by CMs 210-220, respectively, in communication network 200.

Termination device 108 of communication network 100, in contrast, is embodied by a wireless access point 208 in communication network 200. Wireless access point 208 is, for example, a Wi-Fi wireless access point or a cellular wireless access point (e.g., a cellular wireless point operating according to a 3GPP communication protocol, including, but not limited to, a macro cell or a small cell). Wireless access point 208 is not limited to being a complete wireless access point—instead, wireless access point 208 may be a component of a wireless access point, such as a radio head or other element of a distributed wireless access point.

Network elements 122 and 124 of communication network 100 are respectively embodied by optical splitters 222 and 224 in communication network 200, and communication links 140, 142, 144, 146, and 148 of communication network 100 are respectively embodied by optical cables 240, 242, 244, 246, and 248 in communication network 200. Network element 126 of communication network 100 is embodied by a fiber node 226 in communication network 200, where fiber node 226 is configured to convert communication signals between the optical domain and the electrical domain. Network elements 128, 130, 132, and 136 of communication network 100 are respectively embodied by electrical taps 228, 230, 232, and 236 in communication network 200, communication links 150, 152, 154, 156, 158, 160, 164, 166, 168, 170, and 172 of communication network 100 are respectively embodied by coaxial electrical cables 250, 252, 254, 256, 258, 260, 264, 266, 268, 270, and 272 in communication network 200. Communication network elements 134 and 138 of communication network 100 are respectively embodied by amplifiers 234 and 238 in communication network 200.

Communication link 162 of communication network 100 is embodied by a wireless communication link 262 in communication network 200. Wireless communication link 262 is, for example, a Wi-Fi wireless communication link, a Bluetooth wireless communication link, a LoRa wireless communication link, a Zigbee wireless communication link, a cellular wireless communication link, or a satellite wireless communication link. Alternately, wireless communication link 262 may operate according to the same communication protocol used to transmit communication signals via coaxial electrical cable 258, such as a DOCSIS communication protocol, to avoid the need for communication protocol translation with respect to communication signals traversing wireless communication link 262. Additional information on wireless transmission of communication signals without protocol translation may be found in U.S. Pat. No. 11,381,278 to Malas et al, which is incorporated herein by reference.

FIG. 3 is a schematic diagram of a communication network 300, which is an embodiment of communication network 100 of FIG. 1 that is substantially based on passive optical network elements. Some embodiments of communication network 300 are configured to operate at least partially according to an EPON communication protocol, a RFOG communication protocol, a GPON communication protocol, and/or a CPON communication protocol. Hub 106 is embodied by an OLT 306 in communication network 300, and termination devices 110-118 are embodied by ONTs 310-318, respectively. However, termination device 108 of communication network 100 is embodied by a wireless access point 308 in communication network 300, where wireless access point 308 is similar to wireless access point 208 of FIG. 2. Additionally, termination device 120 of communication network 100 is embodied by a satellite ground station 320 in communication network 300. Satellite ground station 320 is configured to communicate with, for example, VLEO satellites, LEO satellites, MEO satellites, and/or GEO satellites.

Network elements 122, 124, 126, 128, 130, 132, and 136 of communication network 100 are respectively embodied by optical splitters 322, 324, 326, 328, 330, 332, and 336 in communication network 300, and communication links 140, 142, 144, 146, 148, 150, 152, 154, 156, 158, 160, 164, 168, and 170 of communication network 100 are respectively embodied by optical cables 340, 342, 344, 346, 348, 350, 352, 354, 356, 358, 360, 364, 368, and 370 in communication network 300. Communication link 162 of communication network 100 is embodied by a wireless communication link 362 in communication network 300, where wireless communication link 362 is similar to wireless communication link 262 of FIG. 2. Network elements 134 and 138 of communication network 100, as well as communication links 166 and 172 of communication network 100, are omitted from communication network 300. Accordingly, optical cable 364 directly connects optical splitters 326 and 336, and optical cable 370 directly connects satellite ground station 320 and optical splitter 336.

FIG. 4 is a schematic diagram of a communication network 400, which is an embodiment of communication network 100 of FIG. 1 that is substantially based on DSL network elements. Some embodiments of communication network 400 are configured to operate at least partially according to a DSL communication protocol. Hub 106 is embodied by a central office 406 in communication network 400, and termination devices 110-120 are embodied by DSL modems 410-420, respectively. Termination device 108 of communication network 100 is embodied by a wireless access point 408 in communication network 400, where wireless access point 408 is similar to wireless access point 208 of FIG. 2.

Network elements 122 and 124 of communication network 100 are respectively embodied by optical splitters 422 and 424 in communication network 400, and communication links 140, 142, 144, 146, and 148 are respectively embodied by optical cables 440, 442, 444, 446, and 448 in communication network 400. Network element 126 of communication network 100 is embodied by a remote DSLAM (RDSLAM) 426 in communication network 400, where RDSLAM 426 is configured to convert communication signals between the optical domain and the electrical domain. Network elements 128, 130, 132, and 136 of communication network 100 are respectively embodied by cross boxes (XBoxes) 428, 430, 432, and 436 in communication network 400. One or more of cross boxes 428, 430, 432, and 436 is optionally replaced by, or supplemented with, a pedestal. Communication links 150, 152, 154, 156, 158, 160, 164, 166, 168, 170, and 172 of communication network 100 are respectively embodied by twisted pair electrical cables 450, 452, 454, 456, 458, 460, 464, 466, 468, 470, and 472 in communication network 400. Communication network elements 134 and 138 of communication network 100 are respectively embodied by bridge taps 434 and 438 in communication network 400. Bridge tap 434 connects twisted pair electrical cable 464 to branch cable 476, and bridge tap 438 connects twisted pair electrical cable 470 to branch cable 478. Branch cables 476 and 478 extend to respective portions of communication network 400 that are not shown in FIG. 4. Communication link 162 of communication network 100 is embodied by a wireless communication link 462 in communication network 400, where wireless communication link 462 is similar to wireless communication link 262 of FIG. 2.

Referring again to FIG. 1, discovery system 102 is configured to automatically generate records 104 of communication network 100, as discussed above. Discovery system 102 is implemented, for example, by analog electronics, digital electronics, and/or optical computing elements. Some embodiments of discovery system 102 are at least partially implemented by a processing subsystem (not shown) executing instructions, such as in the form of software and/or software, stored in a data storage subsystem (not shown), to perform the functions of discovery system 102. While discovery system 102 is depicted as being a single item, discovery system 102 could be implemented by multiple elements that need not be collocated. For example, certain embodiments of discovery system 102 are at least partially implemented in a distributed computing system, e.g., in a cloud computing system. Furthermore, although discovery system 102 is illustrated as being separate from the other elements of communication network 100, discovery system 102 could be at least partially combined with one or more elements of communication network 100. For example, discovery system 102 is at least partially combined with hub 106 in certain embodiments of communication network 100.

Particular embodiments of discovery system 102 are configured to automatically generate records 104 at least partially based on one or more of external information 174, diagnostic information $i_h$ from hub 106, and diagnostic information $i_{t\_k}$ from termination devices 110-120, where k is an index indicating a particular terminal device of termination devices 108-120. In particular example, $i_{k\_1}$ is diagnostic information from termination device 108, $i_{k\_2}$ is diagnostic information from termination device 110, $i_{k\_3}$ is diagnostic information from termination device 112, and so on. Logical connections for transmission of diagnostic information $i_{t\_k}$ between terminal devices 108-120 and discovery system 102 are not shown for illustrative clarity.

It should be noted that discovery system 102 does not rely on diagnostic information from intermediate elements of communication network 100, i.e., from network elements 122-138 which are logically located between hub 106 and termination devices 108-120, which may be particularly advantageous when some or all of the intermediate network elements are incapable of generating diagnostic information. However, discovery system 102 could be modified to rely on additional information, or alternative information, without departing from the scope hereof. For example, some alternate embodiments of discover system 102 use data generated from one or more of network elements 122-138. As another example, certain alternate embodiments of discover system 102 use diagnostic information $i_{t\_k}$ from only a subset of termination devices 108-120, instead of diagnostic information $i_{t\_k}$ from all termination devices 108-120. As an additional example, particular alternate embodiments of discovery system 102 do not use diagnostic data $i_h$ from hub 106.

External information 174 is data that is not generated within communication network 100. Examples of possible external information 174 include, but are not limited to, (a) geographic location of one or more elements of communication network 100 (e.g., street address and/or latitude and longitude), (b) classification of termination device location (e.g., single family home, multi-family building, business, etc.), (c) overlay of streets, utilities, buildings, and/or other features in a service area of the communication network, (d) standard practices of an operator of communication network 100 (e.g., (i) standard cable placement practices, such as whether communication cable is aerial or underground, or whether cable is installed in front of buildings or behind buildings, (ii) type of cable typically deployed, (iii) standard equipment location practices, such as where pedestals or other junction points are typically located, (iv) standard communication network operation practices, (v) standard communication network maintenance practices, (vi) standard communication network expansion practices, (vii) standard communication network repair practices, and/or (viii) standard communication network equipment selection practices, such as range of taps values typically deployed or power and voltage specification of amplifiers typically deployed), (e) known characteristics of communication network 100 (e.g., known topological information of communication network 100, known characteristics of elements of communication network 100, and/or known subscriber information of communication network 100, and/or (f) identity and/or location wireless access points, such as Wi-Fi or cellular wireless access points, that are in-range of communication network 100. Discovery system 102 obtains external information 174, for example, from one or more data storage subsystems (not shown) associated with the operator of communication network 100 and/or from other available data sources (not shown), such as from data sources accessible via the Internet.

Diagnostic information $i_h$ from hub 106 includes information representing status and/or configuration of one or more aspects of communication network 100 from the perspective of hub 106. Diagnostic information $i_h$ may also include information communicated to hub 106 from one or more other elements of communication network 100. Examples of possible diagnostic information $i_h$ include, but are not limited, one or more of (a) information characterizing communication signal pre-equalization performed by hub 106, (b) information characterizing communication signal post-equalization performed by hub 106, (c) frequency domain characteristics of communication signals transmitted and/or received by hub 106, (d) time domain characteristics of communication signals transmitted and/or received by hub 106, (e) power characteristics of communication signals transmitted and/or received by hub 106, (f) information characterizing errors in communication signals transmitted and/or received by hub 106, and (g) information describing configuration of hub 106 and/or operating status of hub 106.

Diagnostic information $i_{t\_k}$ from termination devices 108-120 includes information representing status and/or configuration of one or more aspects of communication network 100 from the perspective of the terminal devices. Examples of possible diagnostic information $i_{t\_k}$ include, but are not limited, one or more of (a) information characterizing communication signal pre-equalization performed by a termination device 108-120, (b) information characterizing communication signal post-equalization performed by a termination device 108-120, (c) frequency domain characteristics of communication signals transmitted and/or received by a termination device 108-120, (d) time domain characteristics of communication signals transmitted and/or received by a termination device 108-120, (e) power characteristics of communication signals transmitted and/or received by a termination device 108-120, (f) information characterizing errors in transmission of communication signals transmitted and/or received by a termination device 108-120, (g) information describing configuration of a termination device 108-120 and/or operating state of a termination device 108-120, and (h) wireless communication information, such as wireless communication signal power, wireless communication modulation order, multiple input-multiple output (MIMO) matrix parameters, etc., in cases where a termination device 108-120 includes a wireless base station. While FIG. 1 depicts diagnostic information $i_{t\_k}$ being directly logically transmitted from termination devices 108-120 to discovery system 102, diagnostic information $i_{t\_k}$ may be indirectly transmitted from termination devices 108-120 to discovery system 102, such as via hub 106 and one or more other elements of communication network 100.

Figure 5:
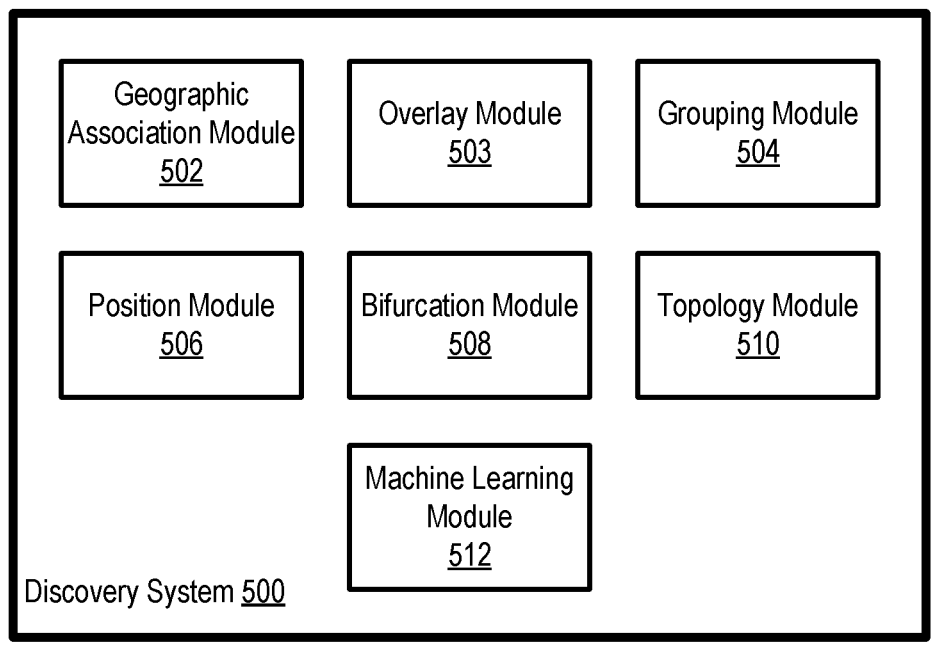
FIG. 5 is a block diagram of one embodiment of the FIG. 1 system for automatic discovery of the communication network.

FIG. 5 is a block diagram of a discovery system 500, which is one possible embodiment of discovery system 102 of communication network 100. It is understood however, that discovery system 102 is not limited to the FIG. 5 embodiment.

Discovery system 500 includes a geographic association module 502, an overlay module 503, a grouping module 504, a position module 506, a bifurcation module 508, a topology module 510, and an optional machine learning module 512, which are discussed below. However, discovery system 500 could be modified to omit one or more of the illustrated modules, or to add one or more additional modules, without departing from the scope hereof. Additionally, although geographic association module 502, overlay module 503, grouping module 504, position module 506, bifurcation module 508, topology module 510, and optional machine learning module 512 are illustrated as being discrete modules, two or more of these modules could be partially or fully combined without departing from the scope hereof. Furthermore, functions of one or more of geographic association module 502, overlay module 503, grouping module 504, position module 506, bifurcation module 508, topology module 510, and optional machine learning module 512 could overlap.

Figure 6:
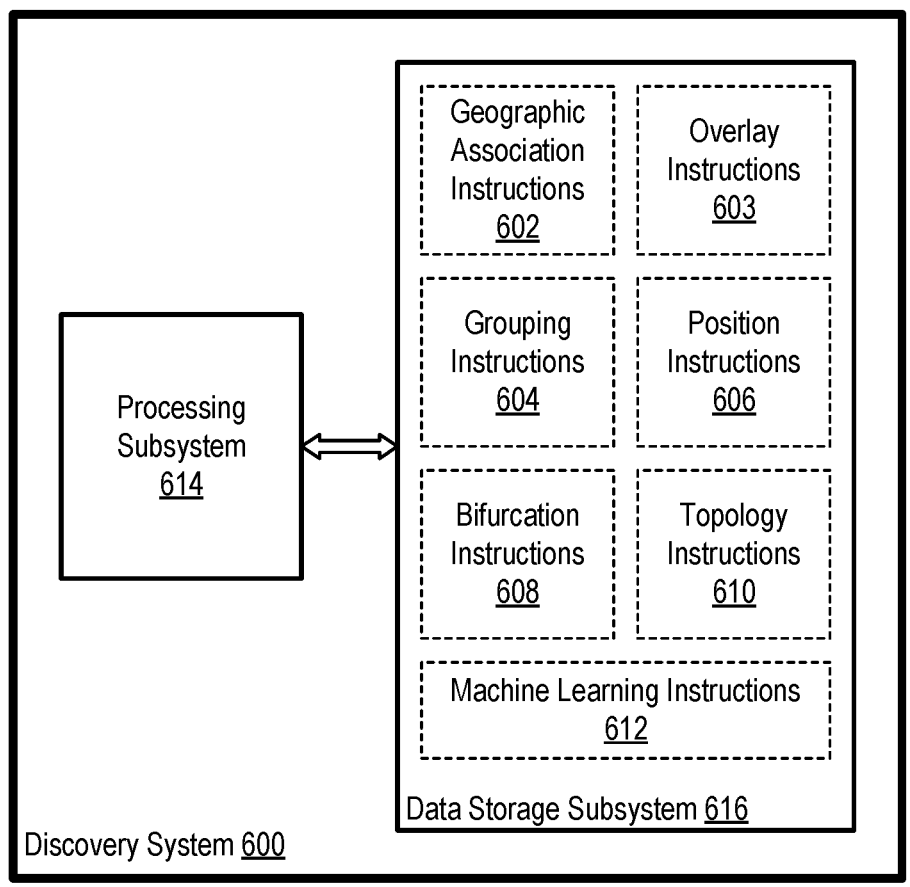
FIG. 6 is a block diagram of an embodiment of the FIG. 5 system including a processing subsystem and a data storage subsystem.

The modules of discovery system 500 are implemented, for example, by analog electronics, digital electronics, and/or optional computing elements. Certain embodiments of discovery system 500 are at least partially embodied by a processor executing instructions in the form of software and/or firmware. For example, FIG. 6 is a block diagram of a discovery system 600, which is an embodiment of discovery system 500 including a processing subsystem 614 and a data storage subsystem 616 including geographic association instructions 602, overlay instructions 603, grouping instructions 604, position instructions 606, bifurcation instructions 608, topology instructions 610, and machine learning instructions 612, where the instructions are in the form of software and/or firmware. Processing subsystem 614 is configured to execute geographic association instructions 602, overlay instructions 603, grouping instructions 604, position instructions 606, bifurcation instructions 608, topology instructions 610, and machine learning instructions 612 to realize the functions of geographic association module 502, overlay module 503, grouping module 504, position module 506, bifurcation module 508, topology module 510, and machine learning module 510, respectively. Although processing subsystem 614 and data storage subsystem 616 are illustrated as being single elements, one or more these elements may include multiple sub-elements which need not be commonly located. For example, processing subsystem 614 and data storage subsystem 616 could be at least partially implemented in a distributed computing system, such as in a cloud computing system.

Geographic Association Module 502

Geographic association module 502 (FIG. 5) is configured to associate geographic information with elements of communication network 100. For example, geographic association module 502 may be configured to associate a respective street address and/or respective latitude and longitude with each termination device 108-120. As another example, geographic association module 502 may be configured to associate a respective altitude with each termination device 108-120, such as in conjunction with associating a respective latitude and longitude with each termination device 108-120. Geographic association module 502 obtains the geographic information via external information 174, for example, from a customer street address database maintained by the operator of communication network 100 and/or from an external geographic information system (GIS) accessible via the Internet.

Overlay Module 503

Overlay module 503 is configured to overlay geographic features, such as roads, bridges, buildings, etc., on a map of communication network 100. Overlay module 503 obtains these geographic features, for example, from external information 174. Overlay module 503 is optionally also configured to overlay likely paths of communication links on a map of communication network 100 based, for example, on communication network operator standard practices. For example, if a given communication network operator typically runs communication cables behind homes (instead of in front of homes), overlay module 503 may overlay likely paths of communication cables behind homes, on a map of communication network 100.

Grouping Module 504

Grouping module 504 is configured to group termination devices 108-120, and/or other elements of communication network 100, having one or more common characteristics, at least partially based on external information 174, diagnostic information $i_n$, and/or diagnostic information $i_{t\_k}$. Discussed below are several example methods of how grouping module 504 may group elements of communication network 100. However, grouping module 504 is not limited to operating according to these example methods. Additionally, grouping module 504 may use a plurality of methods, such as two or more of the example methods discussed below, to group elements of communication network 100. For example, grouping module 504 may use a plurality of methods for grouping elements of communication network 100 to achieve high confidence that the network elements are correctly grouped. As another example, grouping module 504 may execute a plurality of methods for grouping elements of communication network 100 to help ensure complete grouping of the elements.

Some embodiments of grouping module 504 are configured to group elements of communication network 100 in response to similarity of compensation parameters of the network elements meeting a threshold condition. Examples of compensation parameters include, but are not limited to, compensation coefficients for pre-equalization, compensation coefficients for post-equalization, and characteristics of transfer functions for compensating for impairments.

Pre-equalization and post-equalization are used to help compensate for linear distortion in a communication network, such as micro-reflections shared by a group of network elements. For example, pre-equalization can be performed at a transmitter of a communication link by pre-distorting a signal to be transmitted by an inverse of a channel response of the communication link. As another example, post-equalization can be performed at a receiver of a communication link by modifying a received communication signal to cancel linear distortion of the communication link. Both pre-equalization and post-equalization are typically performed by digital filters, where the digital filters have respective taps or coefficients, common referred to as compensation coefficients, which describe the filters' respective frequency responses. Non-linear impairments, on the other hand, can be compensated for using a transfer function that is an inverse of a transfer function of a communication path in including a non-linear impairment.

Communication network elements associated with common compensation parameters are likely to be located in a common portion of the network. For example, referring again to FIG. 1, assume that there is a linear impairment in communication link 150 at location A. The linear impairment causes, for example, micro reflections downstream of location A. Termination devices 110, 112, 114 are each downstream of location A, and each of these termination devices is therefore subjected to the linear impairment when communicating with hub 106. Termination devices 110, 112, and 114 may use similar equalization compensation coefficients to help compensate for the linear impairment at location A. For example, in embodiments where termination devices 110-114 use post-equalization to compensate for communication link distortion when receiving downlink communication signals from hub 106, the three termination devices 110-114 are likely to use similar post-equalization compensation coefficients because all three termination devices are subject to the same linear impairment. Similarly, in embodiments where termination devices 110-114 use pre-equalization to compensate for communication link distortion when transmitting uplink communication signals to hub 106, the three termination devices 110-114 are likely to use similar pre-equalization compensation coefficients because all three termination devices are subject to the linear impairment at location A. Accordingly, similarity in post-equalization compensation coefficients and/or pre-equalization compensation coefficients among termination devices 110-114 indicates that the termination devices are likely downstream of a common linear impairment, which in turn suggests that the three termination devices are located in a common portion of communication network 100, e.g., that all three termination devices 110-114 are served by communication link 150. Similarly, if the impairment at location A is a non-linear impairment, a similar transfer function may be associated with each of termination devices 110-114 to compensate for the common non-linear impairment.

Figure 7:
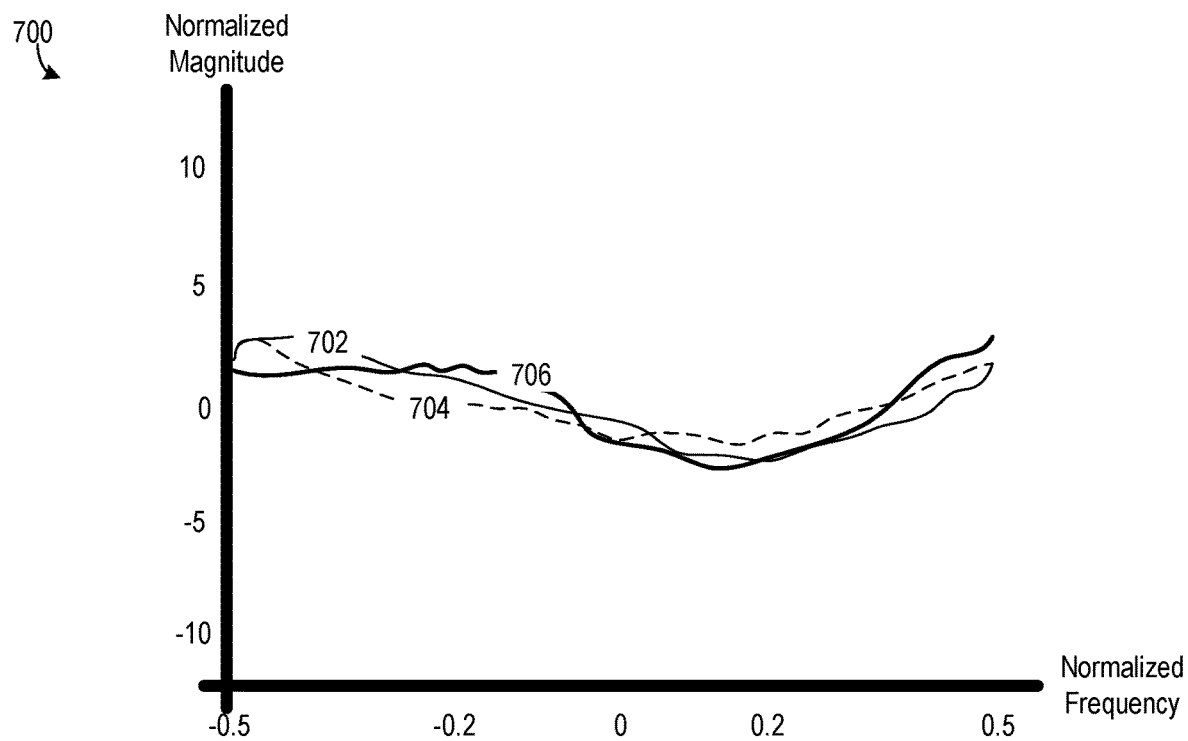
FIG. 7 is a graph of example respective pre-equalization compensation coefficients of three termination devices.
Figure 8:
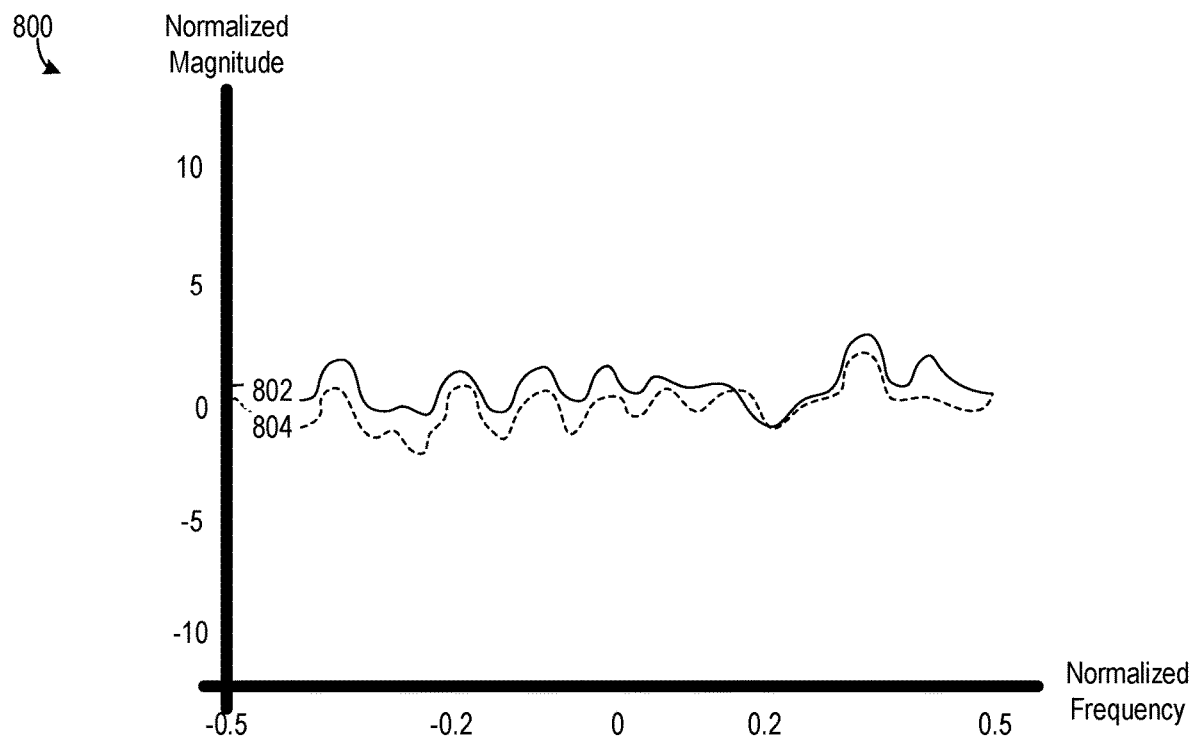
FIG. 8 is a graph of example respective pre-equalization compensation coefficients of two other termination devices.

FIGS. 7 and 8 collectively illustrate one example of how compensation coefficients can be used to identify and group network elements that are likely located in a common portion of a communication network. In particular, FIG. 7 is a graph of example pre-equalization compensation coefficients 702, 704 and 706 from three respective termination devices, and FIG. 8 is a graph of example pre-equalization compensation coefficients from two other respective termination devices. As evident from FIG. 7, compensation coefficients 702, 704, and 706 are similar, which indicates that their corresponding termination devices are located in a common portion of the communication network. Additionally, as evident from FIG. 8, compensation coefficients 802 and 804 are similar, which suggest that their corresponding termination devices are located in a common portion of the communication network. However, compensation coefficients 702, 704, and 706 of FIG. 7 are significantly different from compensation coefficients 802 and 804 of FIG. 8, which suggests that the termination devices corresponding to FIG. 7 are located in a different portion of the communication network than the termination devices corresponding to FIG. 8. As such, grouping module 504 may assign the termination devices corresponding to FIG. 7 to a first group, and grouping module 504 may assign the termination devices corresponding to FIG. 8 to a second group that is different from the first group.

Figure 9:
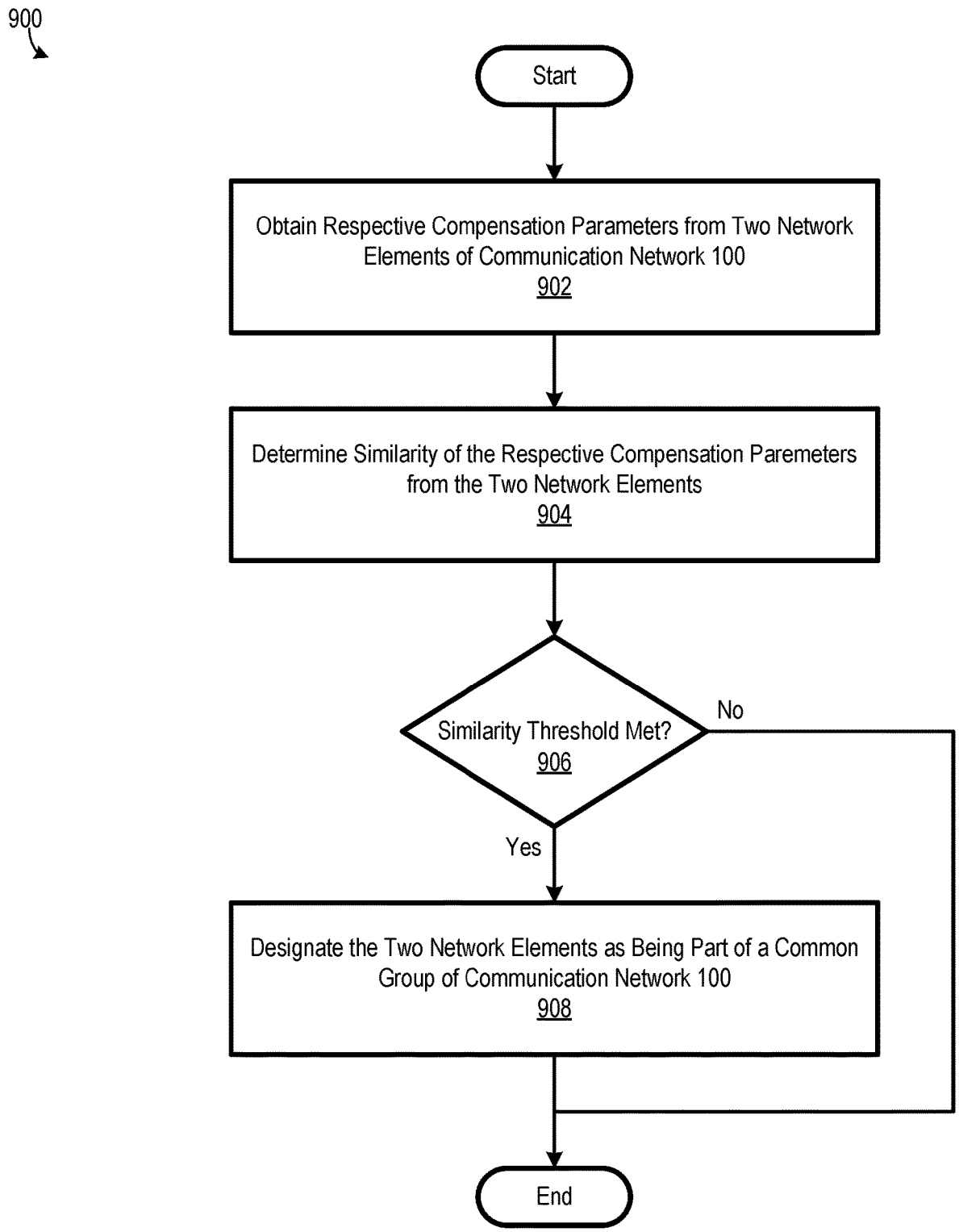
FIG. 9 is a flow chart of a method for grouping network elements according to compensation parameters, according to an embodiment.

Particular embodiments of grouping module 504 are configured to execute a method 900 of grouping network elements according to compensation parameters, as illustrated in a flow chart of FIG. 9. In a block 902 of method 900, grouping module 504 obtains respective compensation parameters from two network elements of communication network 100, or respective compensation parameters associated with two network elements of communication network. In one example of block 902, grouping module 504 obtains respective compensation coefficients from each of termination devices 110 and 112 via diagnostic information $i_{t\_2}$ and $i_{t\_3}$, respectively. In another example of block 902, grouping module 504 obtains respective pre-equalization compensation coefficients for each of termination devices 110 and 112 from hub 106. In a block 904 of method 900, grouping module 504 determines similarity of the respective compensation parameters from, or associated with, the two network elements. In one example of block 904, grouping module 504 determines similarity of compensation coefficients from termination device 110 to compensation coefficients from termination device 112. Grouping module 504 is configured to express similarity, for example, as a single value or a series of values. For example, grouping module 504 may express similarity of compensation parameters using statistical principles for evaluating similarity in values. It should be noted that similarity between compensation parameters could alternatively be replaced with difference between compensation parameters.

In a decision block 906 of method 900, grouping module 504 determines, from the similarity (or difference) determined in block 904, whether a predetermined similarity (or difference) threshold is met, where the threshold represents a minimum similarity (or maximum difference) between the compensation parameters to warrant grouping the termination devices together. In one example of decision block 906, grouping module 504 determines that similarity of compensation coefficients of termination devices 110 and 112 meets a threshold condition, such as due to both the termination devices experiencing a common linear impairment at location A in FIG. 1. If the result of decision block 906 is yes, method 900 proceeds to a block 908, and if the result of decision block 906 is no, method 900 ends. In block 908, grouping module 504 designates the two network elements considered in method 900 as being part of a common group of communication network 100. In one example of block 908, grouping module 504 designates termination devices 110 and 112 as being part of a common group in communication network 100. Grouping module 504 optionally repeats method 900 for a plurality of different pairs of network elements, e.g., for each distinct pair of termination devices 108-120.

Some embodiments of grouping module 504 are configured to compare compensation parameters from a plurality of communication channels when determining whether similarity of compensation parameters of the network elements meets a threshold condition for grouping the network elements. Comparison of compensation parameters from multiple channels may increase accuracy in grouping and/or sensitivity of grouping module 504 to network elements using similar compensation parameters.

Some embodiments of grouping module 504 are configured to group elements of communication network 100 in response to communication signals transmitted and/or received by the network elements having one or more common attributes, such as common attributes caused by a common impairment or other common network feature. Grouping module 504 is configured to determine that communication signals have one or more common attributes, for example, by analyzing the communication signals in the frequency domain and/or in time domain. For instance, certain embodiments of termination devices 108-120 of FIG. 1 are configured to provide to discovery system 102 diagnostic information $i_{t\_k}$. including information characterizing communication signals received and/or transmitted by the termination devices, and grouping module 504 is configured to group two or more of the termination devices in response to their respective communication signals having one or more common attributes. Some embodiments of grouping module 504 are configured to facilitate comparison of communication signals associated with different network elements by calibrating out communication link attenuation and/or by making measurements in a lower portion of communication link spectrum where attenuation is relatively low.

Figure 10:
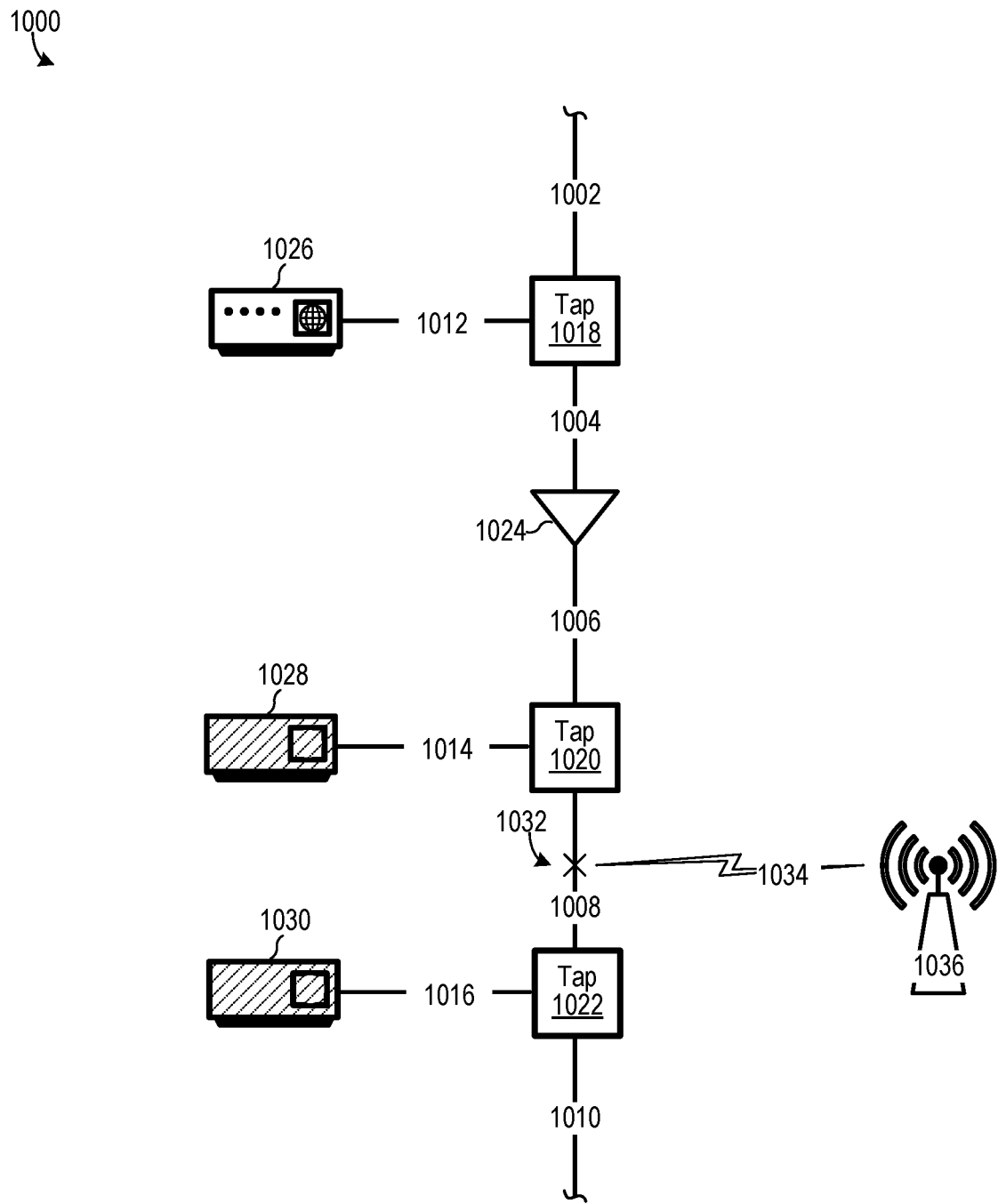
FIG. 10 is a schematic diagram of a section of a communication network that is substantially based on cable network elements and is experiencing ingress of interfering signals.

For example, particular embodiments of grouping module 504 are configured to group two or more elements of communication network 100 in response to the two or more elements experiencing common ingress of interfering signals, as indicated by attributes of communication signals received and/or transmitted by the network elements. Network elements subject to common ingress of interfering signals are likely to be located in a common portion of a communication network because other network elements will typically prevent the interfering signals from traveling through a large portion of the communication network. For instance, FIG. 10 is a schematic diagram of a section 1000 of a communication network that is substantially based on cable network elements, such as a communication network similar to communication network 200 of FIG. 2. Communication network section 1000 includes hard line electrical coaxial cables 1002-1010, drop coaxial electrical cables 1012-1016, taps 1018-1022, an amplifier 1024, and CMs 1026-1030. A crack in shielding of hard line coaxial electrical cable 1008 at location 1032 causes ingress of interfering signals 1034 emitted by a signal source 1036. Signal source 1036 is, for example, a radio station or a wireless base station of another communication network. Interfering signals 1034 travel through a lower half of network portion 1000 before being stopped by amplifier 1024. Amplifier 1024 prevents transmission of interfering signals 1034 further in communication network section 1000, for example, because amplifier 1024 is unidirectional and therefore blocks transmission of interfering signals 1034. Consequently, CMs 1028 and 1030 are affected by ingress of interfering signals 1034, as symbolically shown these two CMs being shaded, while CM 1026 is not affected by ingress of interfering signals 1034, as symbolically shown by CM 1026 not being shaded. The fact that CMs 1028 and 1030 experience common ingress of interfering signals 1034 suggests that the two CMs are located in a common portion of the communication network, e.g., that both CMs are downstream of amplifier 1024, which can be leveraged by particular embodiments of grouping module 504 to group CMs 1028 and 1030 as being part of a common portion of the communication network.

Figure 11:
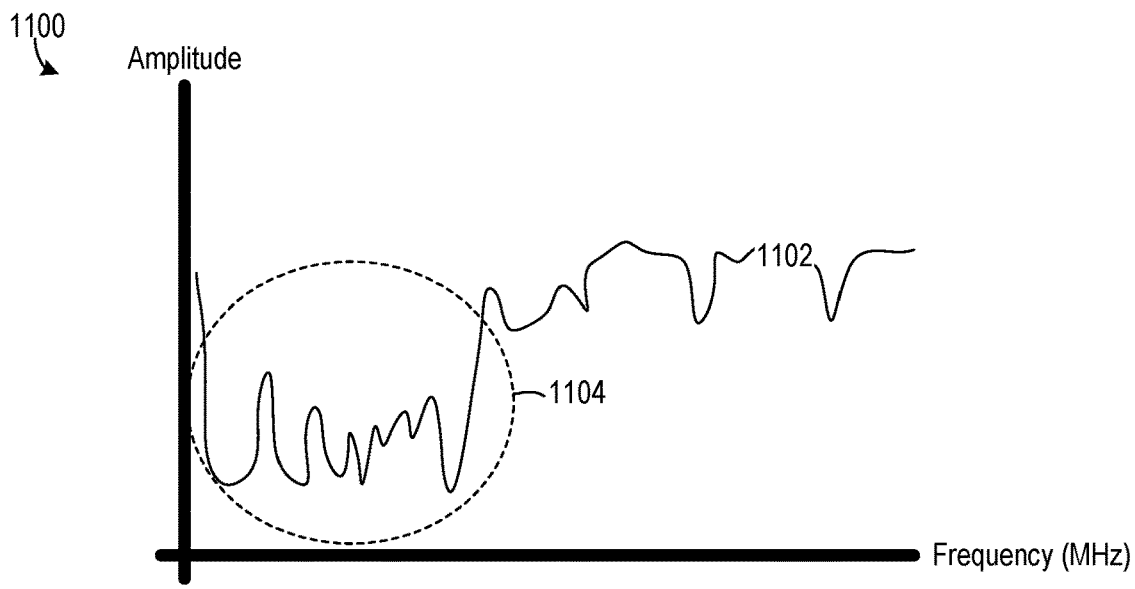
FIG. 11 is a graph of amplitude versus frequency of a downlink communication signal received by a termination device experiencing ingress of interfering signals.

Referring again to FIGS. 1 and 5, particular embodiments of grouping module 504 are configured to determine that two more of termination devices 108-120 are subject to common ingress of interfering signals from full band capture information provided by the termination devices, where the full band capture information represents frequency response of communication signals received by the termination devices. For example, FIG. 11 is a graph 1100 of amplitude versus frequency of an example downlink communication signal 1102 received by a termination device, such as one of termination devices 108-120. Portion 1104 of graph 1100 indicates ingress of frequency modulation (FM) radio signals into a communication link serving the termination device. Grouping module 504 could determine that two or more termination devices 108-120 are part of common network portion and should therefore be grouped together, for example, in response to the two or more termination devices receiving downlink communication signals with evidence of common interference ingress similar to that illustrated in portion 1104 of graph 1100.

Figure 12:
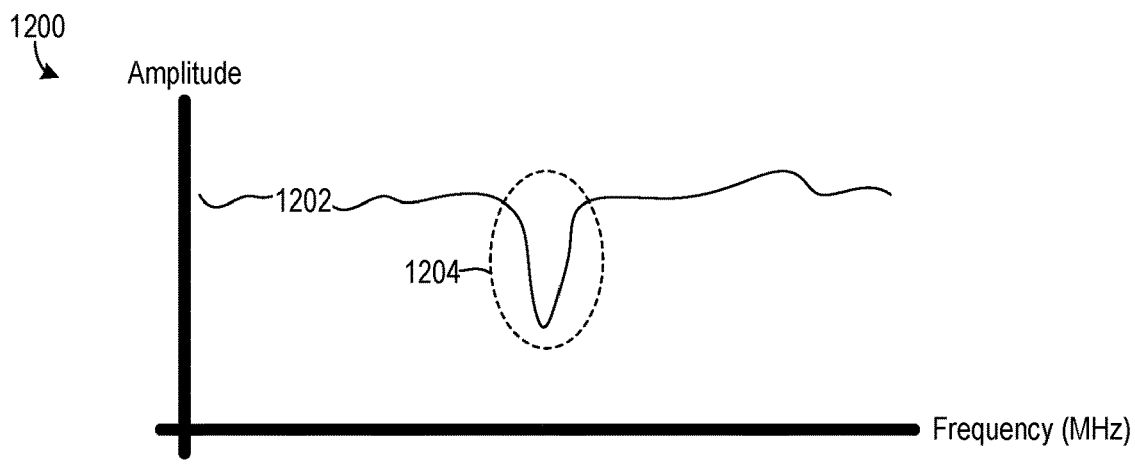
FIG. 12 is a graph of amplitude versus frequency of a downlink communication signal received by a termination device where the downlink communication signal includes a suckout.

Examples of other common attributes in communication signals that grouping module 504 may use as a basis for grouping network elements include, but are not limited to, common suckouts in communication signals, common resonant peaks in communication signals, and common reflections, such as micro reflections, of communication signals. For instance, FIG. 12 is a graph 1200 of amplitude versus frequency of an example downlink communication signal 1202 received by a termination device, such as one of termination devices 108-120. Portion 1204 of graph 1200 indicates a suckout in communication signal 1202. Grouping module 504 could determine that two or more termination devices 108-120 are part of common network portion and should therefore be grouped together, for example, in response to the two or more termination devices receiving downlink communication signals with evidence of a common suckout similar to that illustrated in portion 1204 of graph 1200.

Figure 13:
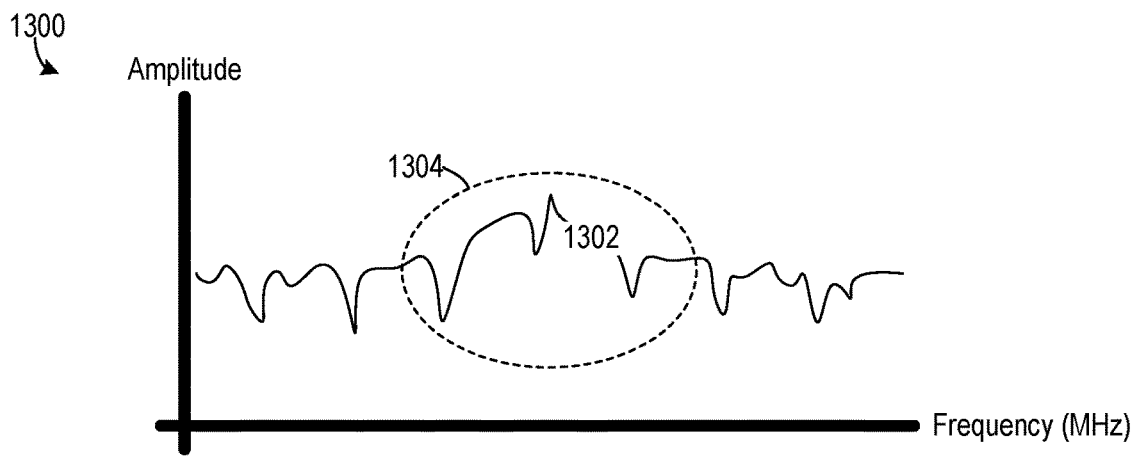
FIG. 13 is a graph of amplitude versus frequency of a downlink communication signal received by a termination device where the downlink communication signal includes a resonant peak.

As another example, FIG. 13 is a graph 1300 of amplitude versus frequency of an example downlink communication signal 1302 received by a termination device, such as one of termination devices 108-120. Portion 1304 of graph 1300 indicates a resonant peak in communication signal 1302. Grouping module 504 could determine that two or more termination devices 108-120 are part of common network portion and should therefore be grouped together, for example, in response to the two or more termination devices receiving downlink communication signals with evidence of a common resonant peak similar to that illustrated in portion 1304 of graph 1300.

Certain embodiments of grouping module 504 are configured to group elements of communication network 100 in response to the network elements having a common modulation error ratio (MER), or in response to the network elements having respective MERs meeting a threshold condition, such as the MERs being greater than a minimum threshold value indicating presence of a network impairment. For example, referring again to FIG. 1, assume that an impairment in communication link 150 at location A is negatively impacting transmission of communication signals between hub 106 and termination devices 110, 112, and 114. Termination devices 110, 112, and 114 may have similar MERs, and/or the termination devices may have respective MERs that are greater than a minimum threshold value, due to the three termination devices being subject to the common impairment at location A. Particular embodiments of grouping module 504 are configured to determine that termination devices 110, 112, and 114 are part of common network portion and should therefore be grouped together in this example scenario in response to the three termination devices having similar MERs, or in response to each of the termination devices having a respective MER that is greater than a predetermined minimum threshold value. Some embodiments of grouping module 504 are configured to determine whether two or more termination devices 108-120 have similar MERs by (a) determining an average or median MER of each termination device, (b) determining a similarity value of the average or median MERs among the termination devices, and (c) determining that the MERs are sufficiently similar and therefore group the termination devices together, in response to the similarity value meeting a threshold condition, e.g., in response to the similarity value being greater than a minimum threshold value.

Similarly, some embodiments of grouping module 504 are configured to group elements of communication network 100 in response to the network elements having a common error correction statistics, or in response to the network elements having error correction statistics meeting a threshold condition, such as error correction statistics being greater than a minimum threshold value that indicates presence of a network impairment. The error correction statistics include, for example, forward error correction (FEC) statistics.

Figure 14:
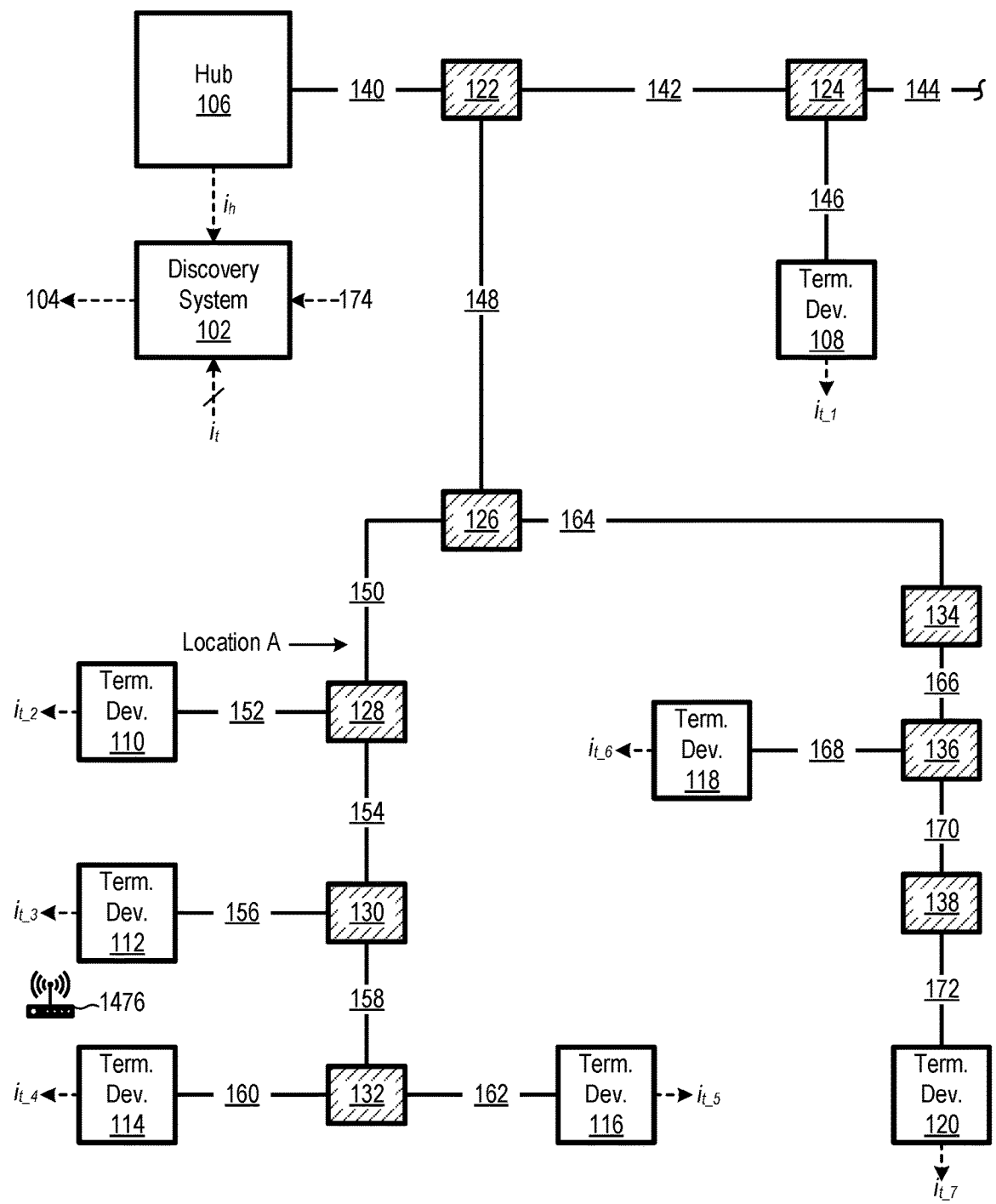
FIG. 14 is a schematic of an embodiment of the FIG. 1 communication network where two termination devices are in range of a common Wi-Fi wireless access point.

Furthermore, particular embodiments of grouping module 504 are configured to group two or more termination devices 108-120 (or other network elements) in response to the termination devices being in range of a common wireless access point, such as a common Wi-Fi wireless access point or a common cellular wireless access point having a relatively small range (e.g., a small cell). For example, FIG. 14 is a schematic diagram of a communication network 1400, which is an embodiment of communication network 100 where (a) a Wi-Fi wireless access point 1476 is in range of termination devices 112 and 114 and (b) termination devices 112 and 114 include wireless transceivers and are thereby capable of detecting presence of Wi-Fi wireless access point 1476. Termination devices 112 and 114 notify discovery system 102 of their detection of Wi-Fi wireless access point 1476 via diagnostic information $i_{t\_3}$ and $i_{t\_4}$ and grouping module 504 groups termination devices 112 and 114 in response to them being in range of common Wi-Fi wireless access point 1476.

Position Module 506

Referring again to FIG. 5, position module 506 is configured to determine position information for communication network 100, such as logical order of the network elements in communication network 100, relative position of network elements in communication network 100, distance between network elements in communication network 100, and/or length of communication links in communication network 100. Discussed below are several example methods that may be executed by position module 506 to determine position information for communication network 100. It is understood, however, that position module 506 is not limited to executing these example methods.

Figure 15:
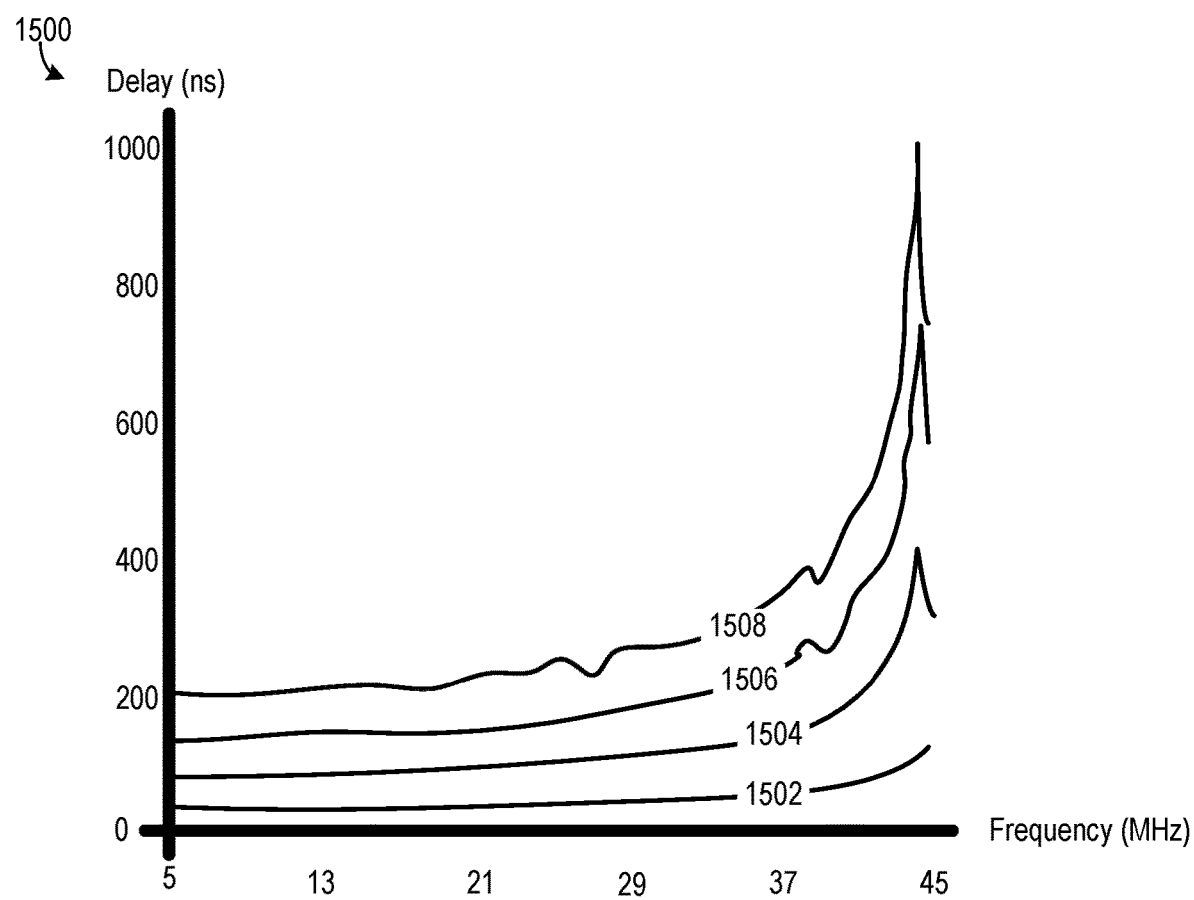
FIG. 15 is a graph of an example of group delay versus frequency for four different elements in a communication network.

Certain embodiments of position module 506 are configured to determine how many amplifiers (or other active network elements) are in cascade with a network element by analyzing distortion, such as group delay, in communication signals transmitted and/or received by the network element. For example, FIG. 15 is a graph 1500 of an example of group delay versus frequency for four different network elements in a communication network including a fiber node. Curve 1502 corresponds to a network element being communicatively coupled to a fiber node without any intervening amplifier, curve 1504 corresponds to a network element being communicatively coupled to the fiber node via one intervening amplifier, curve 1506 correspond to a network element being communicatively coupled to the fiber node via two intervening amplifiers, and curve 1508 corresponds to a network element being communicatively coupled to the fiber node via three intervening amplifiers. As evident from FIG. 15, group delay increases with increasing number of amplifiers between the fiber node and the network element.

Some embodiments of position module 506 are configured to determine number of intervening active network elements, such as number of intervening amplifiers, between a first network element and a second network element as a function of group delay of communication signals transmitted and/or received by the second network element. For example, position module 506 may receive group delay information from one of termination devices 108-120 via diagnostic information $i_{t\_k}$, and position module 506 may determine number of intervening amplifiers between the termination device and hub 106 as a function of the group delay information. For example, position module 506 may be configured to consult a lookup table relating group delay to number of intervening active elements. By way of example and not limitation, Table 1 below is one example of such lookup table. Table 1 relates group delay (GD) at a frequency of 10 MHz to number of intervening active elements, such as number of intervening amplifiers, between hub 106 and a termination device 108-120.

TABLE 1

| Group Delay (GD) @ 10 MHz | Number of Intervening Active Elements |
| --- | --- |
| GD < 50 ns | 0 |
| 50 ns ≤ GD < 100 ns | 1 |
| 100 ns ≤ GD < 175 ns | 2 |
| GD ≥ 175 ns | 3 |

Some embodiments of position module 506 are configured to determine number of intervening active network elements, such as number of intervening amplifiers, between a first network element of communication network 100 and a second network element of communication network 100 as a function of compensation parameters, such as pre-equalization compensation coefficients or post-equalization compensation coefficients, associated with communication signals transmitted between the two network elements. For example, position module 506 may be configured to determine number of intervening active network elements, e.g., number of intervening amplifiers, between hub 106 and one of termination device 108-120 based on pre-equalization compensation coefficients used by hub 106 when transmitting communication signals to the termination device. As another example, position module 506 may be configured to determine number of intervening active network elements, e.g., number of intervening amplifiers, between hub 106 and one of termination device 108-120 based on post-equalization compensation coefficients used by the termination device when receiving communication signals from hub 106. Number of intervening active network elements typically increases with increasing energy of "pre-main tap" compensation coefficients, or in other words, number of intervening active network elements increases with increasing energy of digital filter compensation coefficients used in equalization, where the compensation coefficients are prior to a main compensation component of the digital filter. In some embodiments, position module 506 is configured to consult a lookup table relating compensation coefficient energy, e.g., energy of pre-main tap compensation coefficients, to number of intervening active elements.

Figure 16:
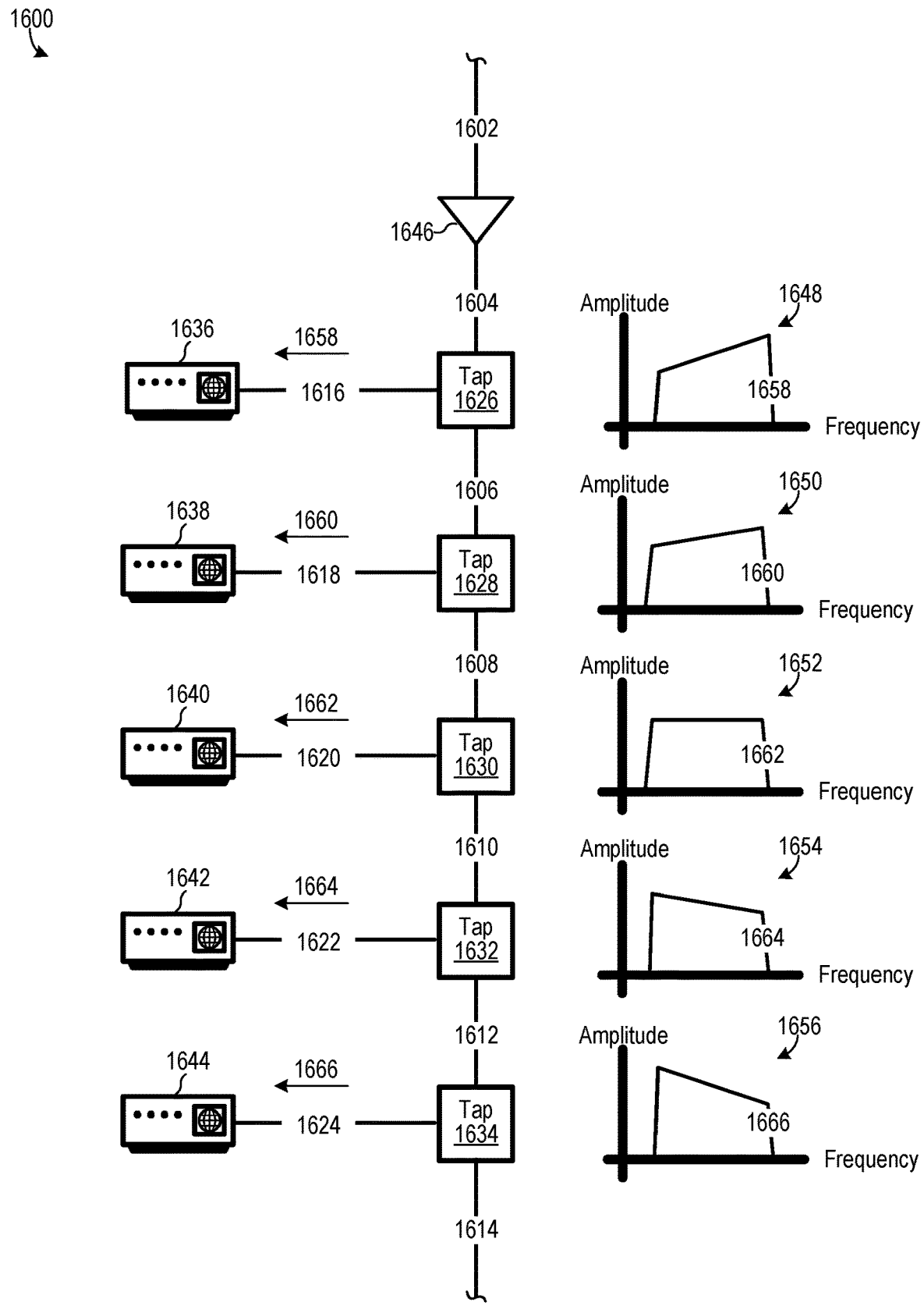
FIG. 16 is a schematic diagram of a section of a communication network that is substantially based on cable network elements and includes multiple termination devices downstream of an amplifier.

Additionally, particular embodiments of position module 506 are configured to determine proximity of a first network element of communication network 100 to an active element of communication network, such as an amplifier, as a function of amplitude tilt of communication signals transmitted to the first network element. For example, FIG. 16 is a schematic diagram of a section 1600 of a communication network that is substantially based on cable network elements, such as a communication network similar to communication network 200 of FIG. 2. Communication network section 1600 includes hard line electrical coaxial cables 1602-1614, drop coaxial electrical cables 1616-1624, taps 1626-1634, CMs 1636-1644, and an amplifier 1646. FIG. 16 also includes graphs 1648-1656 of amplitude versus frequency of respective downlink communication signals 1658-1666 received by cable modems 1636-1644. As illustrated in FIG. 16, communication signals received by CMs that are close to amplifier 1646 have a positive amplitude tilt, CMs that are moderate distance from amplifier 1646 have essentially no tilt, and CMs that are a significant distance from amplifier 1646 have a negative amplitude tilt, where amplitude tilt is change in communication signal amplitude as a function of frequency. Accordingly, some embodiments of position module 506 are configured to determine proximity of a first network element of communication network 100 to an active element of communication network, such as an amplifier, based on polarity (positive and negative) and value of communication signal amplitude tilt. For example, position module 506 may be configured to consult a lookup table relating communication signal tilt to relative distance of a termination device 108-120 from an active network element to determine distance of the termination device from the active network element. In some embodiments, position module 506 is configured to determine order of CMs 1636-1644 from amplifier 1646, e.g., CM 1636 is the first CM after amplifier 1646, CM 1638 is the second CM after amplifier 1646, and so, based communication signal tilt values for CMs 1636-1644. Position module 506 is configured to determine tilt values, for example, from compensation parameters and/or from power measurements.

Furthermore, some embodiments of position module 506 are configured to determine distance between each termination device 108-120 and hub 106 at least partially based on power of communication signals transmitted and/or received by the termination devices 108-120 and hub 106. In particular, in some embodiments, power of received communication signals may decrease with increasing distance between a transmitter and a receiver, and position module 506 may therefore be configured to determine distance between each termination device 108-120 and hub 106 based on one or more (a) power of downlink communication signals received at each termination device 108-120 and (b) power of uplink communication signals received at hub 106, where determined distance increases with decreasing received signal power. Additionally, a transmitter may include automatic gain control, or a similar function, to help compensate for communication signal transmission distance by increasing communication signal transmission power as a function of distance that the communication signal must traverse. Therefore, position module 506 may be configured to determine respective distances between each termination device 108-120 and hub 106 based on one or more (a) power of uplink communication signals transmitted by each termination device 108-120 and (b) power of downlink communication signals transmitted by hub 106, where determined distance increases with increasing transmitted communication signal power. Such determination of distance based on communication signal power may be performed with multiple communication channels, such as to increase accuracy of determined distances.

Additionally, certain embodiments of position module 506 are configured to determine information related to communication network element identification and/or configuration by performing path loss analysis to determine impact of attenuation and insertion loss on a communication signal as it traverses elements of communication network 100. For example, loss $L_T$ between network element 126 and termination device 112 may be modeled by the following equation, where the variables are defined in Table 2 below: $L_T = L_{126} + L_{150} + L_{128} + L_{154} + L_{130} + L_{156}$. Position module 506 may obtain via external information 174 estimated insertion loss for various types of network elements, and position module 506 may deduce the composition of a path between two points in communication network 100 from (a) measured loss between the two points and (b) estimated insertion loss of possible network elements located between the two points. For example, if measured loss between two points is significantly less than insertion loss of a tap, position module 506 may conclude that there is no tap present between the two points. As another example, if measured loss between two points is substantially equal to the sum of insertion loss of two cables and insertion loss of a tap, position module 506 may conclude that there are two cables and one tap connected in series between the two points.

TABLE 2

| Variable | Description |
| --- | --- |
| $L_{126}$ | Loss associated with network element 126 |
| $L_{150}$ | Loss associated with communication link 150 |
| $L_{128}$ | Loss associated with network element 128 |
| $L_{154}$ | Loss associated with communication link 154 |
| $L_{130}$ | Loss associated with network element 130 |
| $L_{156}$ | Loss associated with communication link 156 |

Attenuation and insertion loss are typically frequency dependent, and position module 506 may therefore be configured to perform path loss analysis at several different frequencies. For example, particular embodiments of position module 506 are configure to (a) determine downlink path loss analysis at each of 50 Megahertz (MHz), 450 MHz, and 1,000 MHz, and (b) determine uplink path loss analysis at each of 10 MHz, 85 MHz, and 200 MHz.

Figure 17:
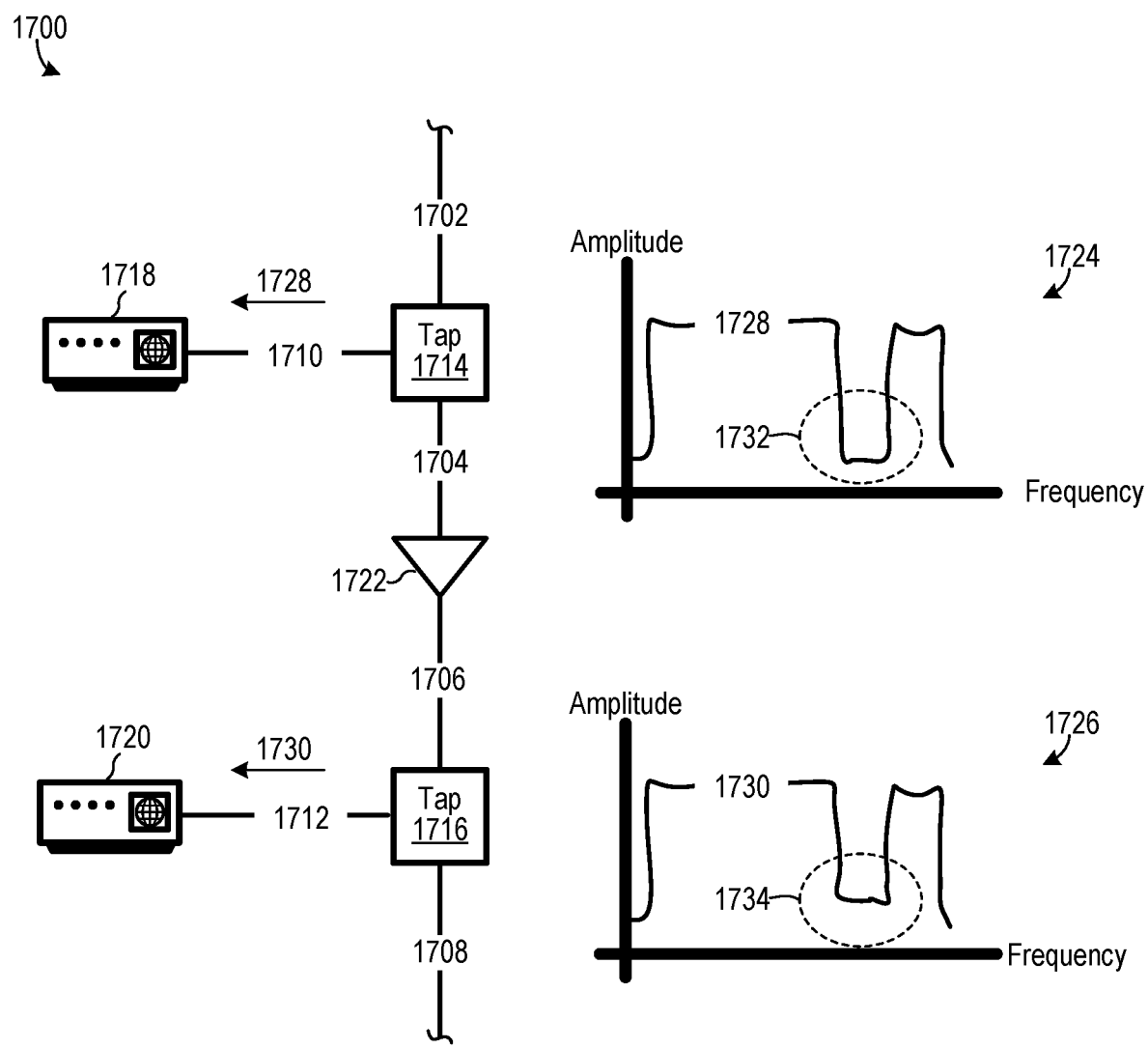
FIG. 17 is a schematic diagram of a section of a communication network that is substantially based on cable network elements and includes an amplifier introducing non-linear distortion in downlink communication signals.

Moreover, particular embodiments of position module 506 are configured to determine presence of an amplifier, or other element causing non-linear distortion, between two network elements from difference in distortion of respective communication signals at the two network elements. For example, FIG. 17 is a schematic diagram of a section 1700 of a communication network that is substantially based on cable network elements, such as a communication network similar to communication network 200 of FIG. 2. Communication network section 1700 includes hard line electrical coaxial cables 1702-1708, drop coaxial electrical cables 1710 and 1712, taps 1714 and 1716, CMs 1718 and 1720, and an amplifier 1722 communicatively coupled between taps 1714 and 1716. FIG. 17 also includes graphs 1724 and 1726 of amplitude versus frequency of respective downlink communication signals 1728 and 1730 received by CMs 1718 and 1720. As illustrated in FIG. 17, downlink communication signals 1728 and 1730 include respective distortion 1732 and 1734. However, distortion 1734 of downlink communication signal 1730 is different from distortion 1732 of downlink communication signal 1728, due to amplifier 1722 introducing non-linear distortion upstream of CM 1720. Accordingly, position module 506 could be configured to determine presence of an amplifier, or other non-linear distortion source, between taps 1714 and 1716 in response to difference in distortion of downlink communication signals 1728 and 1730, such as difference in distortion exceeding a predetermined threshold value.

Furthermore, particular embodiments of position module 506 are configured to determine relative or absolute locations of one or more of termination devices 108-120 at least partially based on information associated with one or more wireless access points in the vicinity of the termination devices. For example, referring again to FIG. 14, assume that termination devices 112 and 114 are capable of providing discovery system 102 information on strength of wireless communication signals received by the termination devices from Wi-Fi wireless access point 1476. Position module 506 could be configured to estimate respective distances of termination devices 112 and 114 from Wi-Fi wireless access point 1476 at least partially based strengths of wireless communication signals received from Wi-Fi wireless access point 1476, because wireless communication signal strength at a termination device generally increases with decreasing distance between the termination device and the Wi-Fi wireless access point. For example, strength of wireless communication signals received at termination device 112 from Wi-Fi wireless access point 1476 will generally increase with decreasing distance between termination device 112 and Wi-Fi wireless access point 1476. Position module 506 could then determine locations of termination devices 112 and 114 from (a) known location of Wi-Fi wireless access point 1476 and (b) respective distance of each termination device 112 and 114 from Wi-Fi wireless access point 1476.

Alternately or additionally, position module 506 could be configured to determine location of a termination device 108-120 via triangulation of wireless communication signals emitted by multiple wireless access points (not shown) with known locations that are in range of the termination device. For example, position module 506 could be configured to determine location of a termination device 108-120 via intersection of respective concentric signal strength rings of wireless communication signals emitted by three wireless access points in range of the termination device.

Additionally, some embodiments of position module 506 are configured to determine a respective distance between each termination device 108-120 and hub 106 at least partially based on a respective timing offset associated with each termination device i.e., time required for communication signals to travel between the termination devices and hub 106. Such distance determinations are not only useful in determining characteristics of communication network 100, but they may also be used to detect unauthorized relocation of a termination device 108-120. Timing offset generally increases with increasing distance between hub 106 and a termination device 108-120, but timing offset may also be affected by factors unrelated to distance, such as type of chip set used in the termination device. Therefore, some embodiments of position module 506 are configured to adjust measured timing offset values to compensate for factors that are unrelated to distance, to enable accurate determination of distance between hub 106 and termination devices 108-120 based on timing offset. Additionally, particular embodiments of position module 506 are configured to rank relative distance of termination devices 108-120 from hub 106 based, e.g., from closest to furthest, at least partially based on respective timing offsets of termination devices 108-120. Furthermore, some embodiments of position module 506 are configured to determine distance of communication links of communication network 100 from timing offsets, such as by dividing a timing offset associated with a communication link by speed of the communication signal traveling through the communication link.

Furthermore, particularly embodiments of position module 506 are configured to associate termination device 108-120 with respective taps, splitters, or similar network elements, using the following procedure or a variation thereof. While the following procedure is discussed in the context of termination devices being CMs that are communicatively coupled to taps, it is understood that the following procedure could be adapted for associating other types of termination devices (e.g., ONTs, DSL modem, wireless modems) with coupling devices analogous to taps (e.g., splitters, wireless base stations, pedestals, cross boxes, etc.).

Consider a single quantity (e.g., uplink timing offset, e.g., time for an uplink communication signal to travel from a CM to hub 106) that is measured at each of N CMs in a cluster, where N is an integer greater than one. Suppose also that we take, say, M repeated measurements of this quantity at each of the N CMs, where M is a positive integer. We can record these M N measurements in the form of a matrix X in a data store with M rows (one for each measurement sample), and N columns (one for each CM).

Let us define a new graph where each vertex of the graph is a pair (1, CM(1)) including a tap location 1 and the CM connected to that tap (ignoring taps to which no CMs are attached). This procedure corresponds to moving the locations of the CMs so that they are co-located with the taps to which they are attached. Note that there are N vertices in this graph, corresponding to the N CMs. Although measurements for the quantity of interest occur only at the CMs and not the taps, because in this graph a tap and its associated CM are combined into a single vertex, we may say that we have M measurements at each of the N vertices of the graph. The edges of this graph correspond to the coaxial path segments from tap to tap.

Depending on the quantity of interest (e.g., uplink timing offset), position module 506 may have some prior knowledge of the probability distribution of this quantity over the nodes of our graph, or some relationship (say a statistical correlation) between the measurements of this quantity over the different nodes of the graph.

A problem for position module 506 to solve is one of graph estimation. Based on the measurements of one or more quantities of interest, we want position module 506 to estimate the above graph (i.e., the vertices and the edges) to yield the following: (1) the locations of the taps and (2) the identities of the CMs attached to the taps at the presumed locations of the taps. Additionally, certain conditions need to be satisfied by these estimated graphs, such as (a) no loops or branches within a cluster, and (b) the graph must conform to known properties of the distribution of the measured quantity over the CMs, or the correlations between these measurements across the CMs. The following example illustrates this for the case where the quantity of interest is timing offset, below.

We know that a linear ordering exists between the timing offsets of the CMs in a cluster belonging to a single coaxial path. Thus, the relative ordering of the CMs along this single coaxial path can be found from the linear ordering of their timing offsets. Of course, we may linearly order any collection of timing offset measurements, so to ensure that the corresponding CMs where these measurements were made actually belong to one cluster, and we will check for a linear relationship between each CM and the other CMs in the cluster.

If the matrix X is that of timing offset measurements at the N CMs, we will try to express each CM's measurement as a linear combination of the measurements at the remaining CMs. Suppose the (i, j)th entry in X is $x_{i,j}$, corresponding to the ith measurement sample at CM j, where i=1, . . . , M and j=1, . . . , N. Then we assume that the same linear relationship between the measurement at CM j and that at all other CMs 1, . . . , j−1, j+1, . . . , N holds for all measurement samples:

$$x_{i,j} = \beta_1^{(j)} x_{i,j} + \ldots \beta_{j-1}^{(j)} x_{i,j-1} + \beta_j^{(j)} x_{i,j+1} + \ldots + \beta_{N-1}^{(j)} x_{i,N}, \quad \text{(EQN. 1)}$$

$$i = 1, \ldots M.$$

In other words, the coefficients $\beta_1^{(j)}, \ldots, \beta_{N-1}^{(j)}$ do not depend on i.

EQN. 1 can be written more compactly using the following notation: let $x_j$ be the jth column of X and let $X^{(j)}$ be the matrix that remains when the jth column is removed from X. Let $\beta^{(j)}$ be the column vector containing the values $\beta_1^{(j)}, \ldots, \beta_{N-1}^{(j)}$. Then EQN. 1 may be rewritten as follows:

$$x_j = X^{(j)} \beta^{(j)}. \quad \text{(EQN. 2)}$$

It is not expected that EQN. 2 will hold exactly for any set of measurements because of noise in the measurements. Therefore, position module 506 does not solve EQN. 2 directly for the coefficients $\beta^{(j)}$, in this embodiment. Instead, position module 506 may be configured to try to find coefficients $\beta^{(j)}$ that minimize the sum of squared differences between the left and right sides of EQN. 3 below, $$\beta^{(j)} = \underset{\beta}{\operatorname{argmin}} \|x_j - X^{(j)} \beta\|_2^2. \quad \text{(EQN. 3)}$$

where for any vector with n entries $y=[y_1, \ldots, y_n]$, we define the $L_2$ norm of y to $$\|y\|_2 = \sqrt{y_1^2 + \ldots + y_n^2}.$$

In practice, EQN. 3 does not always yield reasonable values of the coefficients $\beta^{(j)}$. For example, the coefficients may be so large as not to be physically plausible. Consequently, in practice, often a so-called penalty or regularizer term is added to the minimization problem of EQN. 3 as follows:

$$\beta^{(j)} = \underset{\beta}{\operatorname{argmin}} [\|x_j - X^{(j)} \beta\|_2^2 + \alpha \|\beta\|_2^2]. \quad \text{(EQN. 4)}$$

In EQN. 4 above, $\alpha > 0$ is a scale factor that can be adjusted to determine how severely to penalize large values of the coefficients. EQN. 4 may be referred to as ridge regression.

Although ridge regression is widely used in many scenarios, it is not the best choice when trying to find the neighborhood of the variable $x_j$, i.e, the set of other CMs in the cluster that contains CM j. For this problem, the lasso estimator given by $$\beta^{(j)} = \underset{\beta}{\operatorname{argmin}} [\|x_j - X^{(j)} \beta\|_2^2 + \alpha \|\beta\|_1], \quad \text{(EQN. 5)}$$

is preferred, where for the vector with n entries $y = [y_1, \ldots, y_n]$, we define the $L_1$ norm of y to be $$\|y\|_1 = |y_1| + \ldots + |y_n|.$$

The change from using the $L_2$ norm in the ridge regression of EQN. 4 to the $L_1$ norm in the lasso of EQN. 5 has the important consequence that in the optimal solution, there are likely to be entries of $\beta^{(j)}$ that are exactly zero (which does not happen with the ridge regression). The extent of the shrinkage of the neighborhood is determined by the penalty parameter a, with larger values of a shrinking the neighborhood size more. The consequence is that the non-zero entries of $\beta^{(j)}$ define the neighborhood of $x_j$. The follow discussion explores the implications of this result for the graph estimation problem.

Figure 18:
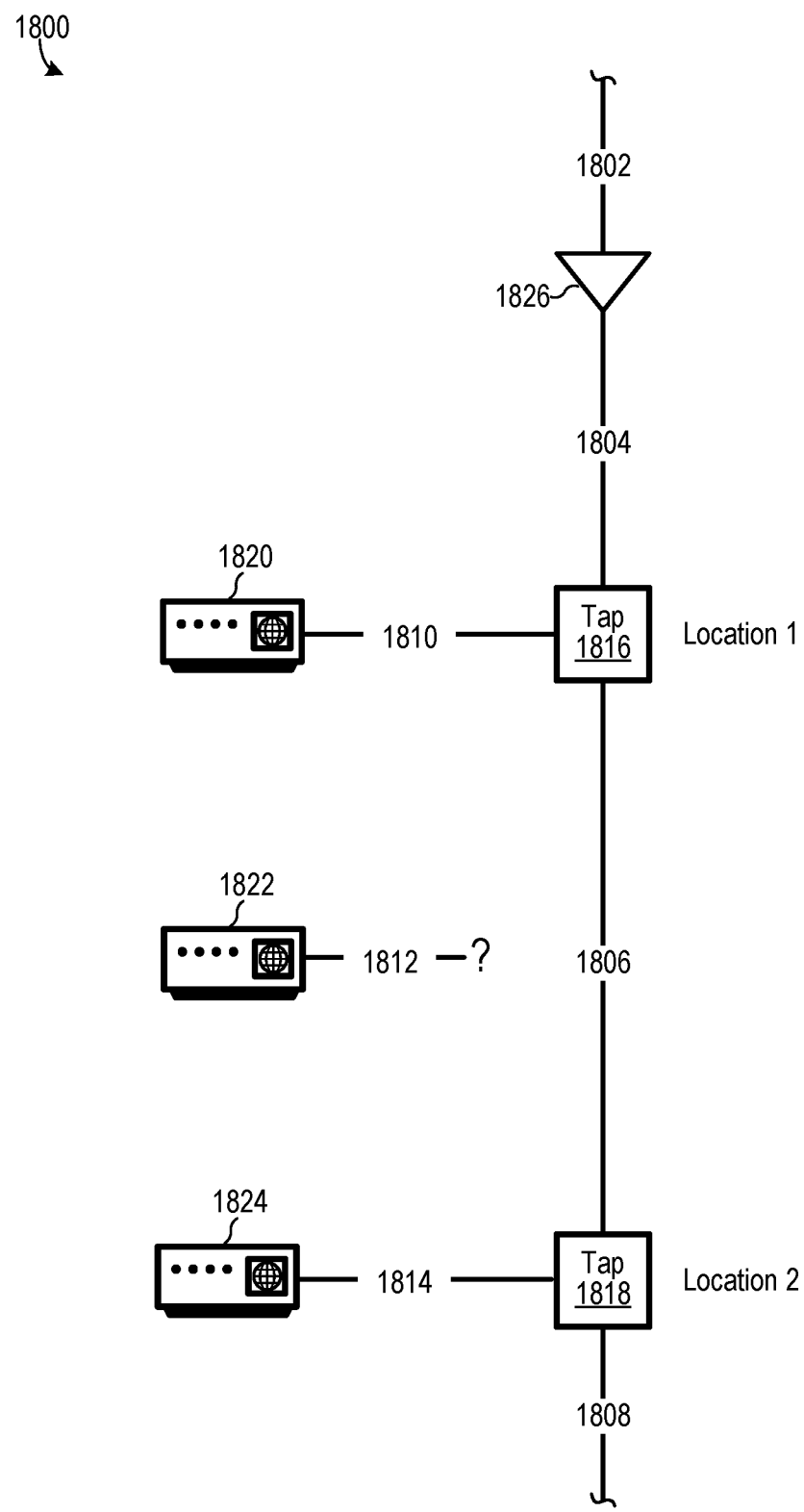
FIG. 18 is a schematic diagram of a section of a communication network that is substantially based on cable network elements and includes a cluster of cable modems.

Consider a small cluster as shown in a section 1800 of a communication network as illustrated in FIG. 18, where the communication network is substantially based on cable network elements. Network section 1800 includes hard line coaxial electrical cables 1802-1808, drop coaxial electrical cables 1810-1814, taps 1816 and 1818, CMs 1820-1824, and an amplifier 1826. A cluster of CMs 1820-1824 follows amplifier 1826. A linear coaxial electrical cable path goes from amplifier 1826 to tap 1816 at location 1 and from there to tap 1818 at location 2. Tap 1816 and 1818 location candidates are obtained, for example from geographic information. However, it is unknown whether CM 1822 is communicatively coupled to tap 1816 at location 1 or whether CM 1822 is communicatively coupled to tap 1818 at location 2. In other words, does the graph have the vertex (location 1, CM2) or the vertex (location 2, CM2)?

To answer this question, position module 506 may be configured to apply EQN. 5 with j=2 to the measurements of timing offset at the CMs in the cluster of FIG. 18. If CM 1822 is attached to location 1, then it is upstream of CM 1824 and so the coefficient in $\beta^{(2)}$ corresponding to the dependence of the timing offset at CM 1822 on that at CM 1824 is positive, while the coefficient corresponding to the dependence of the timing offset at CM 1822 on that at CM 1820 should be unity. On the other hand, if CM 1824 is attached to location 2, then it is downstream of CM 1820 and so the coefficient in $\beta^{(2)}$ corresponding to the dependence of the timing offset at CM 1822 on that at CM 1820 is positive, while the coefficient corresponding to the dependence of the timing offset at CM 1822 on that at CM 1824 should be unity.

Finally, if network section 1800 further includes any additional CMs (not shown) that do not belong to the cluster of CMs 1820-1824, then for each CM j in the cluster, the coefficient in $\beta^{(j)}$ corresponding to the dependence of the timing offset at CM j on that at the unlabeled CM should be zero when solving EQN. 5.

Position module 506 could be configured to expand the scope of the graph estimation problem beyond that of finding the graph of a cluster that is behind an amplifier or other network element. For example, we may assume a communication layout from a fiber node, or other network element, to be a tree. In this case, graph estimation algorithms need search only in the space of tree graphs. The problem of graph inference subject to constraints like the tree property can be decomposed into two sub-problems, one of which uses a modified Lasso method to identify a graph topology that satisfies the desired constraint on graph type.

Bifurcation Module 508

Referring again to FIG. 5, bifurcation module 508 is configured to determine bifurcations or splits in communication network 100, such as a split implemented by a splitter or by a tap. For example, certain embodiments of bifurcation module 508 are configured to determine presence of a splitter or tap (or other analogous network element) between two nodes from difference in power level of communication signals at the two nodes. For instance, bifurcation module 508 could be configured to determine presence of a splitter or tap between first and second network nodes is response to power of communication signals at the second network node being less than power of communication signals at the first network node by at least a threshold amount. Additionally, particular embodiments of bifurcation module 508 are configured to determine a signal splitting ratio of a splitter or tap (or other analogous network element) from a difference in respective communication signal power levels entering and leaving the splitter or tap.

As another example, some embodiments of bifurcation module 508 are configured to determine presence of a splitter or tap (or analogous network element) between two nodes from a difference in active communication signal channels at the two nodes. For instance, bifurcation module 508 could be configured to determine presence of a splitter or tap between first and second network nodes is response to five communication channel being active at the first network node and only four communication channels being active at the second network node. Such difference in number of active communication channels at the two nodes suggests that one of the five communication channels is being split off from the other four communication channels between the first and second network nodes.

Topology Module 510

Topology module 510 determines the topology of communication network 100, including a respective communication path from each termination device 108-120 to hub 106, at least partially based on input from geographic association module 502, overlay module 503 grouping module 504, position module 506, and/or bifurcation module 508. For example, in some embodiments, topology module 510 determines a topology using some or all of the following steps: (1) identify termination devices sharing a common node, such as a common fiber node, a common OLT, a common wireless access point, a common DSLAM, etc., such as based on external information 174, analysis from grouping module 504, and/or analysis from position module 506, (2) place nodes and termination devices based on geographic information, e.g., street address and/or latitude and longitude, such as based on associations from geographic association module 502 and/or information from overlay module 503, (3) identify location and type of node (e.g., amplifier, tap, splitter, splice, power inserter, repeater, translator, pedestal, cross-box, terminal, fiber node, DSLAM, wireless access point, etc.), such as based on external information 174, associations from geographic association module 502, information from overlay module 503, analysis from grouping module 504, and/or analysis from position module 506, (4) identify termination devices sharing a common network node (e.g., amplifier, repeater, or wireless access point) branch, such as based on analysis from grouping module 504, analysis from position module 506, and/or analysis from bifurcation module 508, (5) identify termination devices sharing a common communication link segment, such as based on information from overlay module 503, analysis from grouping module 504, analysis from position module 506, and/or analysis from bifurcation module 508, (6) identify termination devices sharing a common distribution node (e.g., a common tap, splitter, coupler, etc.), such as based on analysis from grouping module 504, analysis from position module 506, and/or analysis from bifurcation module 508, (7) identify termination device position within a communication link segment, such as based analysis from position module 506, (8) identify distribution node (e.g., tap, splitter, coupler, etc.) characteristics, such as based on external information 174 and/or analysis from bifurcation module 508, (9) determine respective lengths of communication links, such as by using analysis from position module 506, and (10) identify termination devices sharing a common communication link, such as based on external information 174, analysis from grouping module 504, analysis from position module 506, and/or analysis from bifurcation module 508.

Certain embodiments of topology module 510 are configured to recursively determine topology of communication network 100, such as by determining the topology of communication network a plurality of times and refining the topology determination at each determination. Topology module 510 may use different approaches for determining topology at two or more of the recursive steps.

Machine Learning Module 512

Machine learning module 512, which is optional, is configured to assist one or more of the other modules of discovery system 500 using machine learning techniques, including but not limited to using artificial intelligence. For example, some embodiments of machine learning module 512 are configured to assist topology module 510 in determining the topology of communication network 100, such as by training machine learning module 512 in communication network topology determination. As another example, certain embodiments of machine learning module 512 are configured to assist grouping module 504 in grouping of network elements, such as by training machine learning module 512 to recognize two or more network elements that common share one or more common features.

Example of Operation

Discussed below with respect to FIGS. 19-24 are one example of how discovery system 500 may determine the topology of communication network 100 in the embodiment of FIG. 2 where the communication network is substantially based on cable network elements. However, discovery system 500 is not limited to operating according to the examples of FIGS. 19-24. Additionally, discovery system 500 could be configured to execute steps in a different order than presented in FIGS. 19-24. Furthermore, discovery system 500 need not be configured perform all of the steps presented in FIGS. 19-24. Moreover, discovery system 500 could be configured to perform one or more steps other than those presented in FIGS. 19-24, such as in addition to those presented in FIGS. 19-24 or in place of those presented in FIGS. 19-24.

Figure 19:
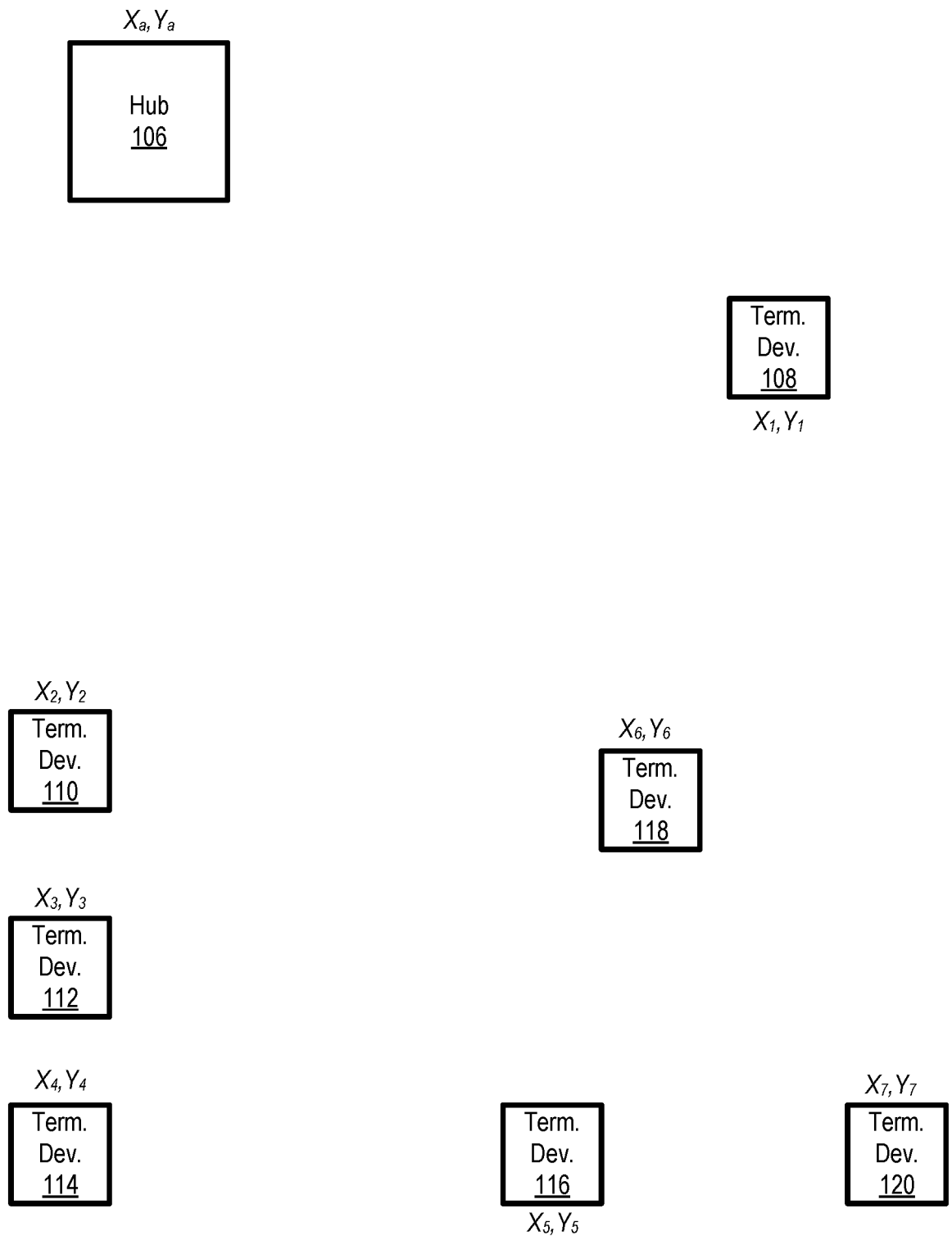
FIG. 19 illustrates an example of the FIG. 2 communication network with respective latitude and longitude values associated with network components, according to an embodiment.

Discovery system 500 begins the example topology determination process by geographic association module 502 associating respective latitude $X_k$ and longitude $Y_k$ with each termination device 108-120 of communication network 100, as illustrated in FIG. 19. In particular, geographic association module 502 associates latitude $X_1$ and longitude $Y_1$ with termination device 108, geographic association module 502 associates latitude $X_2$ and longitude $Y_2$ with termination device 110, geographic association module 502 associates latitude $X_3$ and longitude $Y_3$ with termination device 112, and so on. Geographic association module 502 also associates latitude $X_a$ and longitude $Y_a$ with hub 106. Geographic association module 502 could associate other geographic information with termination devices 108-120, such as street address, building type, and/or altitude, in addition, or in place of, longitude and latitude.

Figure 20:
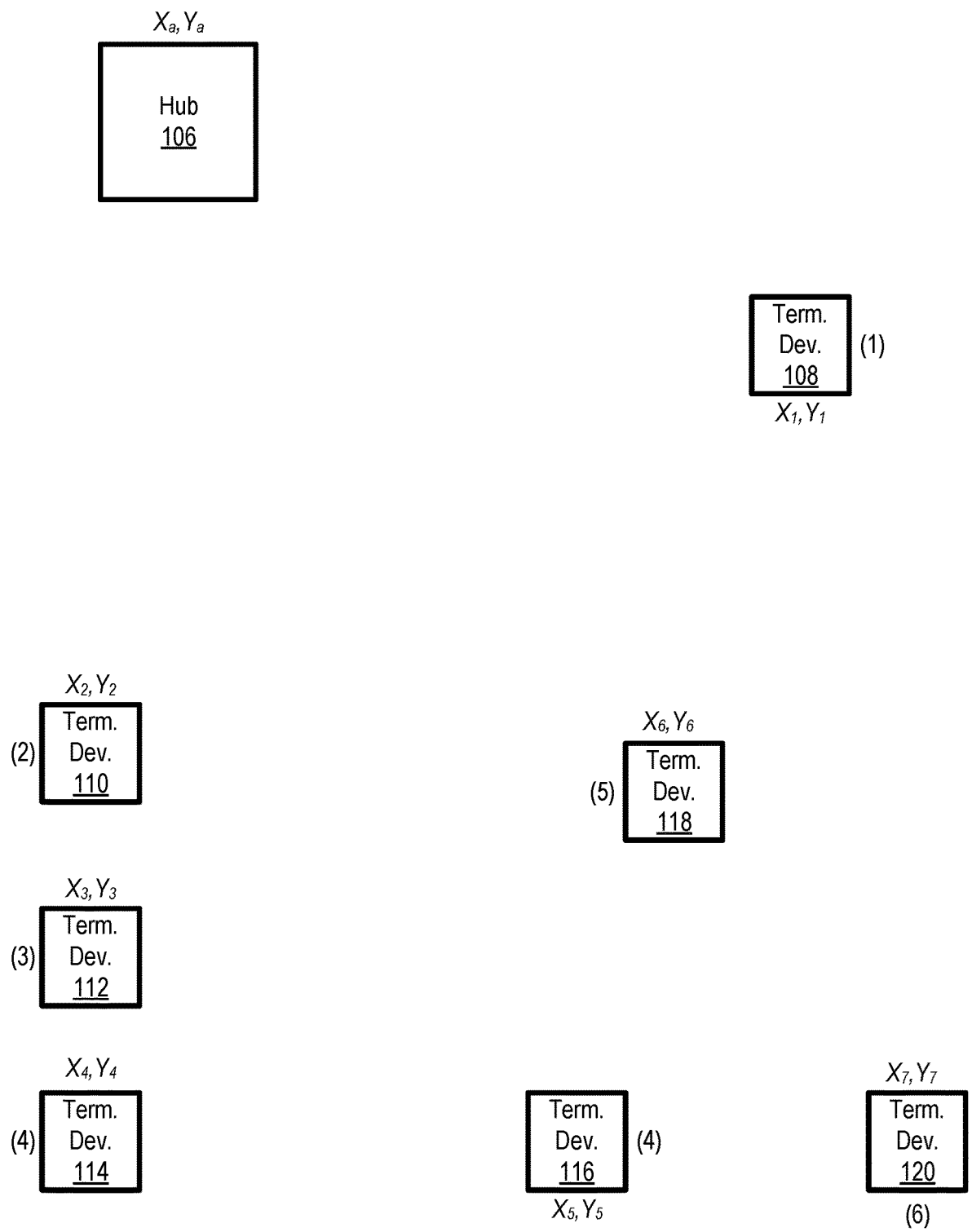
FIG. 20 illustrates an example of the FIG. 2 communication network where termination devices are ranked based on their distance to a hub of the communication network, according to an embodiment.

Position module 506 next ranks termination devices 108-120 based on distance from hub 106, where the first termination device is closest to hub 106, the second termination device is second closest to hub 106, the third termination device is third closest to hub 106, and so on. FIG. 20 illustrates each termination device 108-120 with its ranking in parenthesis. For example, termination device 108 is ranked 1 and is therefore the closest termination device to hub 106 of the six termination devices in communication network 100, while termination device 120 is ranked 6 and is therefore the furthest termination device from hub 106 of the six termination devices in communication network 100.

Figure 21:
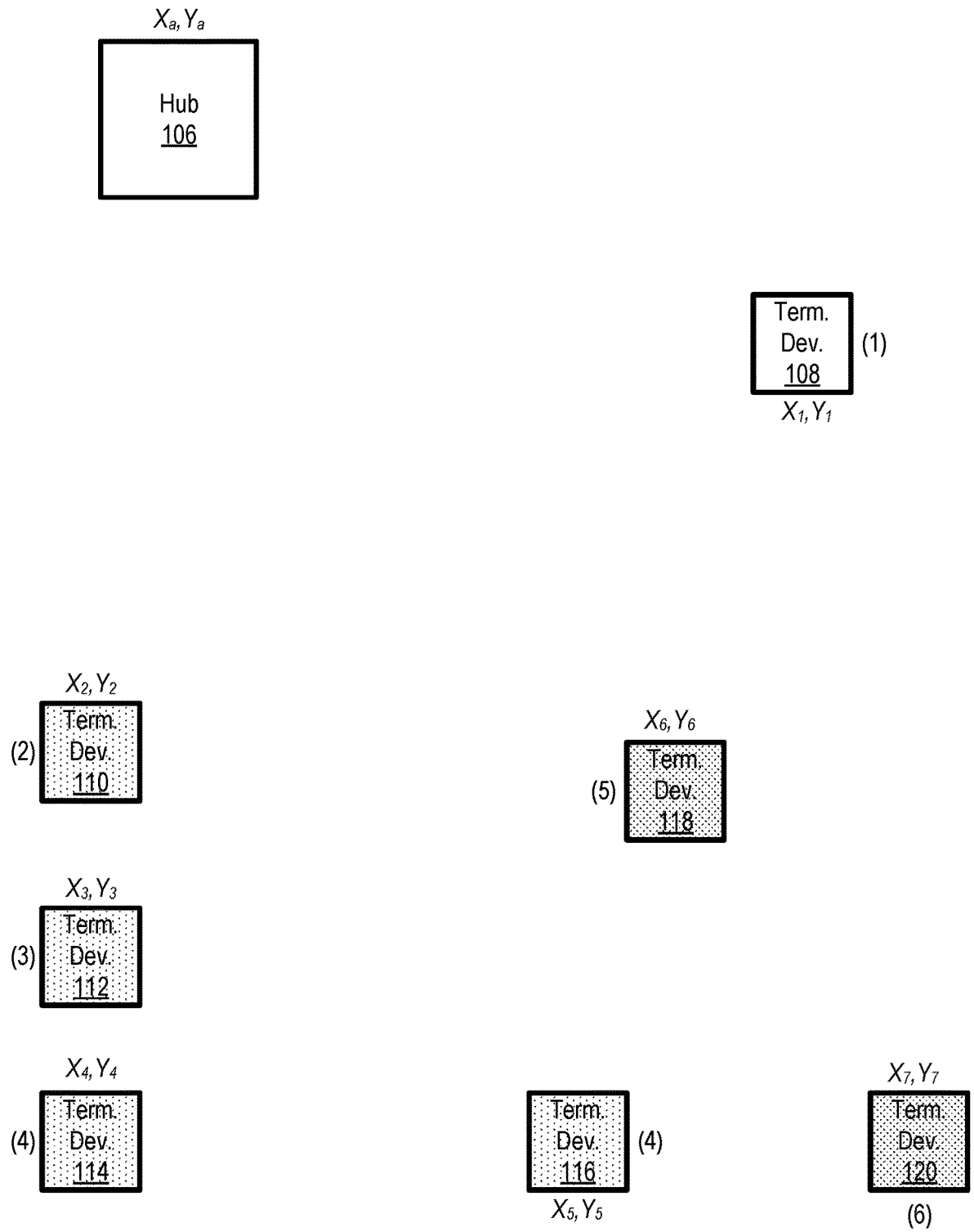
FIG. 21 illustrates an example of the FIG. 2 communication network where termination devices having common characteristics are grouped, according to an embodiment.

Grouping module 504 next groups termination devices having common characteristics. For example, FIG. 21 illustrates grouping of termination devices 110-116 as being located in a common portion of communication network 100, as illustrated by these four termination devices being lightly shaded, as well as grouping of termination devices 118 and 120 as being in another common portion of communication network 100, as illustrated by these two termination devices being more darkly shaded. In some embodiments, input from position module 506 is also used for grouping of termination devices.

Figure 22:
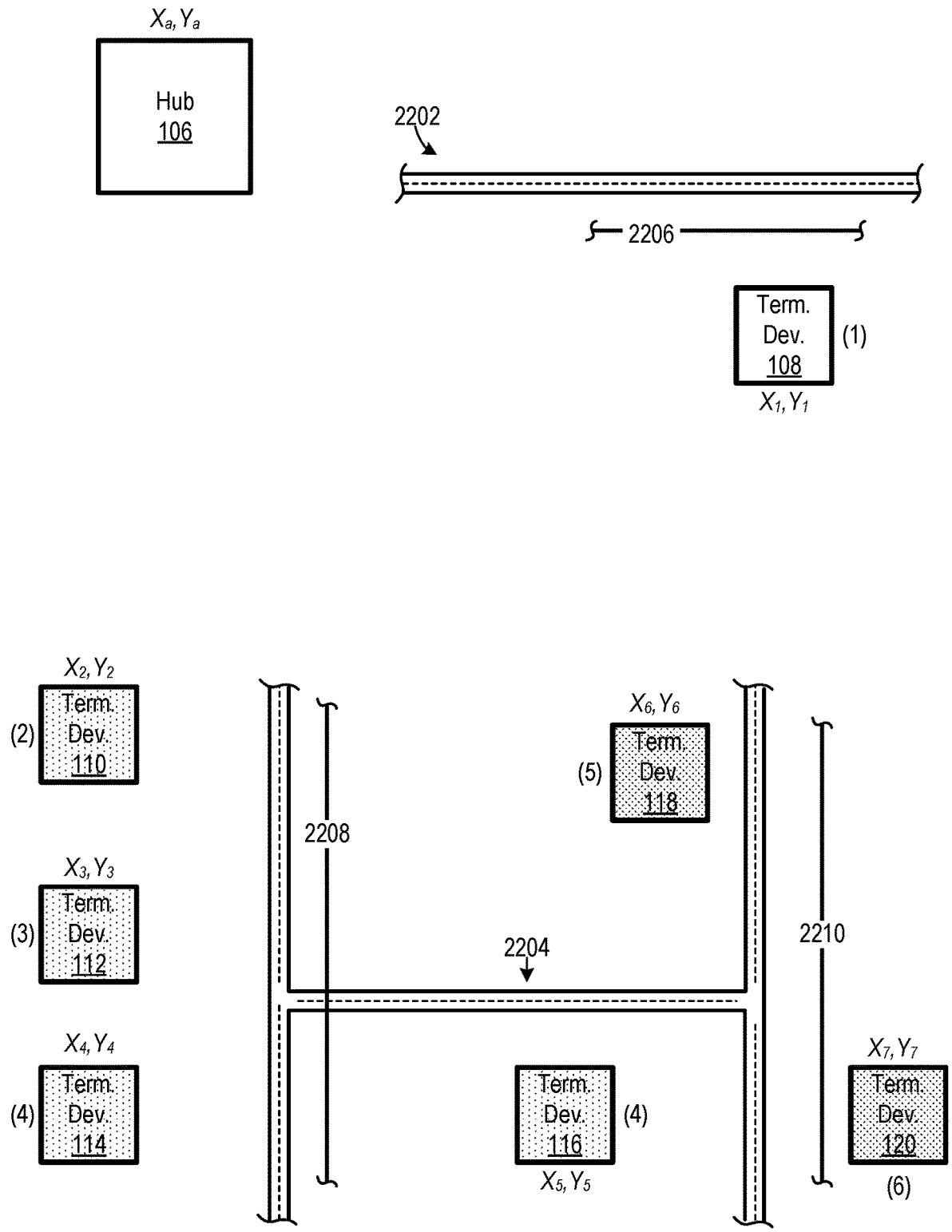
FIG. 22 illustrates an example of the FIG. 2 communication network with roads and likely locations of communication links overlaid on a map of the communication network, according to an embodiment.

Overlay module 503 next overlays roads 2202 and 2204 on a map of communication network 100, as illustrated in FIG. 22. Additionally, overlay module 503 overlays likely locations of communication links 2206, 2208, and 2210 in the vicinity of termination devices 108-120, such as based on operator standard practices from external information 174, as also illustrated in FIG. 22.

Figure 23:
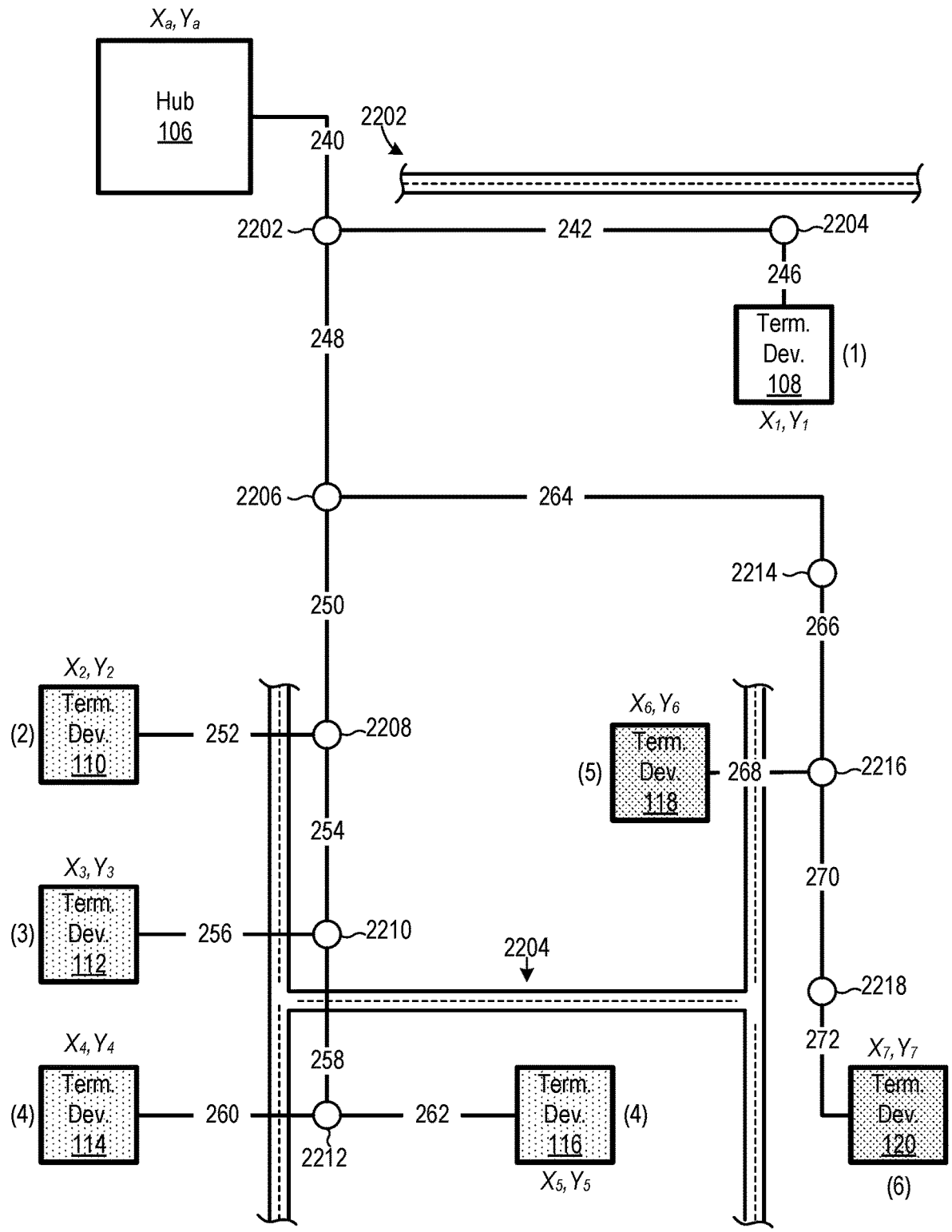
FIG. 23 illustrates an example of the FIG. 2 communication network after topology discover, according to an embodiment.
Figure 24:
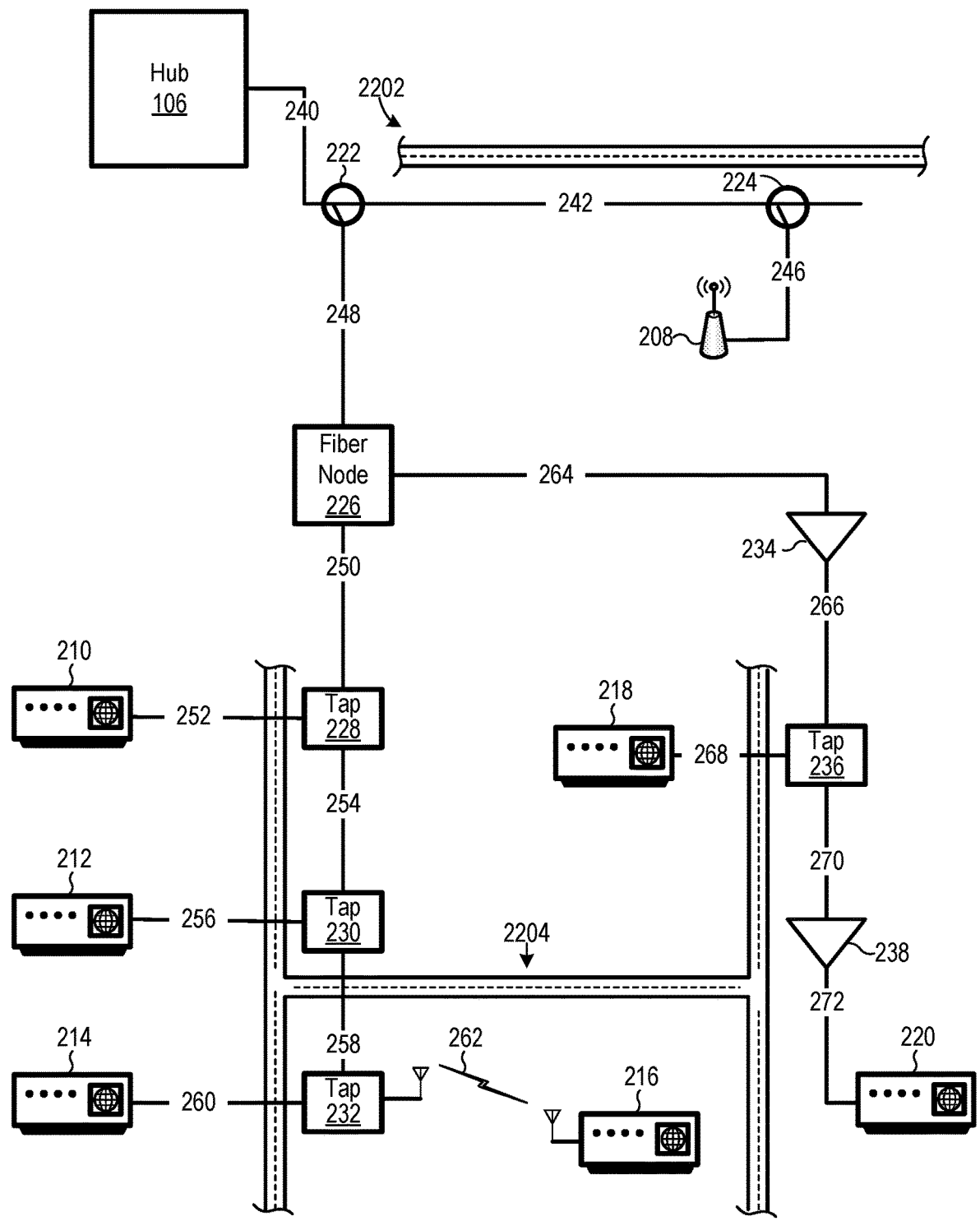
FIG. 24 illustrates an example of the FIG. 2 communication network after network elements are identified, according to an embodiment.

Bifurcation module 508 determines bifurcation points in communication network 100, and topology module 510 then determines topology of communication network 100, as illustrated in FIG. 23, such as at least partially based on input from overlay module 503, grouping module 504, position module 506, and/or bifurcation module 508. It should be noted that the type of network element at each node 2202-2218 in FIG. 23 is unknown at this point. As a final step, discovery system 500 add network element characteristics to the discovery topology, as illustrated in FIG. 24, such based on external information 174 and analysis from grouping module 504, position module 506, and/or bifurcation module 508. Examples of possible network element characteristics include, but are not limited to, one or more of identity of the network elements, description of the network elements (e.g., manufacturer, model, class, specifications, type, and/or serial number of the network elements), configuration of the network elements, and power consumption of the network elements.

Features described above may be combined in various ways without departing from the scope hereof. The following examples illustrate some possible combinations.

(A1) A method for automatic discovery of a communication network including a hub, a plurality of termination devices, and a plurality of network elements, the method including (1) associating respective geographic information with each termination device, (2) determining a respective distance of each termination device from the hub, (3) grouping, at least partially based on diagnostic information from the communication network, two or more of the plurality of termination devices sharing a common characteristic, (4) determining a topology of the communication network, and (5) determining a respective characteristic of at least one network element of the plurality of network elements.

(A2) In the method denoted as (A1), determining the topology of the communication network may include determining a respective path to each termination device from the hub.

(A3) In either one of the methods denoted as (A1) and (A2), associating respective geographic information with each termination device may include associating respective latitude and longitude with each termination device.

(A4) In any one of the methods denoted as (A1) through (A3), associating respective geographic information with each termination device may include associating altitude with each termination device.

(A5) In any one of the methods denoted as (A1) through (A4), determining a respective distance of each termination device from the hub may include determining a respective timing offset associated with each termination device.

(A6) In any one of the methods denoted as (A1) through (A5), the common characteristic may include a common impairment.

(A7) In any one of the methods denoted as (A1) through (A6), the common characteristic may include being in range of a common wireless access point.

(A8) In any one of the methods denoted as (A1) through (A7), grouping the two or more termination devices of the plurality of termination device sharing the common characteristic may include grouping the two or more termination devices at least partially based on compensation parameters associated with the two or more termination devices.

(A9) In any one of the methods denoted as (A1) through (A8), grouping the two or more termination devices of the plurality of termination devices sharing the common characteristic may include grouping the two or more termination devices at least partially based on communication signals associated with the two or more termination devices having one or more common attributes.

(A10) In the method denoted as (A9), the one or more common attributes may include common ingress of interfering signals.

(A11) In either one of the methods denoted as (A9) and (A10), the one or more common attributes may include a common reflection of a communication signal.

(A12) In any one of the methods denoted as (A9) through (A11), the one or more common attributes may include a common resonant peak in a communication signal.

(A13) In any one of the methods denoted as (A1) through (A12), grouping the two or more termination devices of the plurality of termination devices sharing the common characteristic may include grouping the two or more termination devices at least partially based on one or more of (1) modulation error ratios of the two or more termination devices and (2) forward error correction statistics of the two or more communication devices.

(A14) In any one of the methods denoted as (A1) through (A13), determining the topology of the communication network may include determining a quantity of active network elements in cascade with a first network element of the plurality of network elements, at least partially based on group delay of communication signals transmitted and/or received by the first network element.

(A15) In any one of the methods denoted as (A1) through (A14), determining the topology of the communication network may include determining a quantity of intervening active network elements between a first network element of the plurality of network elements and a second network element of the plurality of network elements at least partially based on group delay of communication signals transmitted and/or received by the second network element.

(A16) In any one of the methods denoted as (A1) through (A15), determining the topology of the communication network may include determining proximity of a first network element of the plurality of network elements to an active network element of the plurality of network elements at least partially based on amplitude tilt of communication signals transmitted to the first network element.

(A17) In any one of the methods denoted as (A1) through (A16), determining the topology of the communication network may include determining presence of first network element of the plurality of network elements causing non-linear distortion between second and third network elements of the plurality of network elements, from difference in distortion of respective communication signals at the second and third network elements.

(B1) A method for automatic grouping of network elements in a communication network includes (1) obtaining (a) first compensation parameters associated with a first network element and (b) second compensation parameters associated with a second network element, (2) determining similarity of the first compensation parameters and the second compensation parameters, (3) determining that the similarity meets a threshold condition, and (4) in response to determining that the similarity meets the threshold condition, designating the first and second network elements as being part of a common group of network elements in the communication network.

(B2) In the method denoted as (B1), obtaining the first compensation parameters may include obtaining the first compensation parameters from diagnostic information from the first network element, and obtaining the second compensation parameters may include obtaining the second compensation parameters from diagnostic information from the second network element.

(C1) A method for automatic grouping of network elements in a communication network includes (1) obtaining respective communication signal amplitude tilt values for a plurality of termination devices of the communication network and (2) determining order of the plurality of termination devices from an upstream active network element of the communication network based on the respective communication signal amplitude tilt values.

(C2) In the method denoted as (C1), the upstream active network element may include an amplifier.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for automatic discovery of a communication network including a hub, a plurality of termination devices, and a plurality of network elements, the method comprising:
    associating respective geographic information with each termination device;
    determining a respective distance of each termination device from the hub;
    grouping, at least partially based on diagnostic information from the communication network, two or more of the plurality of termination devices sharing a common characteristic;
    determining a topology of the communication network at least partially based on (a) the respective geographic information associated with each termination device, (b) the respective distance of each termination device from the hub, and (c) an indication from the grouping of two or more of the plurality of termination devices sharing the common characteristic that the two or more of the plurality of termination devices are in a common portion of the communication network; and
    determining a respective characteristic of at least one network element of the plurality of network elements.

2. The method of claim 1, wherein determining the topology of the communication network comprises determining a respective path to each termination device from the hub.

3. The method of claim 1, wherein associating respective geographic information with each termination device comprises associating respective latitude and longitude with each termination device.

4. The method of claim 1, wherein associating respective geographic information with each termination device comprises associating altitude with each termination device.

5. The method of claim 1, wherein determining the respective distance of each termination device from the hub comprises determining a respective timing offset associated with each termination device.

6. The method of claim 1, wherein the common characteristic comprises a common impairment.

7. The method of claim 1, wherein the common characteristic comprises being in range of a common wireless access point.

8. The method of claim 1, wherein grouping the two or more termination devices of the plurality of termination devices sharing the common characteristic comprises grouping the two or more termination devices at least partially based on compensation parameters associated with the two or more termination devices, the compensation parameters being for compensating for one or more communication link impairments.

9. The method of claim 1, wherein grouping the two or more termination devices of the plurality of termination devices sharing the common characteristic comprises grouping the two or more termination devices at least partially based on communication signals associated with the two or more termination devices having one or more common attributes.

10. The method of claim 9, wherein the one or more common attributes comprise common ingress of interfering signals.

11. The method of claim 9, wherein the one or more common attributes comprise a common reflection of a communication signal.

12. The method of claim 9, wherein the one or more common attributes comprise a common resonant peak in a communication signal.

13. The method of claim 1, wherein grouping the two or more termination devices of the plurality of termination devices sharing the common characteristic comprises grouping the two or more termination devices at least partially based on one or more of (a) modulation error ratios of the two or more termination devices and (b) forward error correction statistics of the two or more communication devices.

14. The method of claim 1, wherein determining the topology of the communication network comprises determining a quantity of active network elements in cascade with a first network element of the plurality of network elements, at least partially based on group delay of communication signals transmitted and/or received by the first network element.

15. The method of claim 1, wherein determining the topology of the communication network comprises determining a quantity of intervening active network elements between a first network element of the plurality of network elements and a second network element of the plurality of network elements at least partially based on group delay of communication signals transmitted and/or received by the second network element.

16. The method of claim 1, wherein determining the topology of the communication network comprises determining proximity of a first network element of the plurality of network elements to an active network element of the plurality of network elements at least partially based on amplitude tilt of communication signals transmitted to the first network element.

17. The method of claim 1, wherein determining the topology of the communication network comprises determining presence of a first network element of the plurality of network elements causing non-linear distortion between second and third network elements of the plurality of network elements, from difference in distortion of respective communication signals at the second and third network elements.

* * * * *